(12) United States Patent  
Demandolx et al.

(10) Patent No.: US 9,092,884 B2
(45) Date of Patent: *Jul. 28, 2015

(54) AUTOMATIC IMAGE STRAIGHTENING

(71) Applicant: Microsoft Corporation, Redmond, WA (US)

(72) Inventors: Denis Demandolx, Redmond, WA (US); Sing Bing Kang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/790,634

(22) Filed: Mar. 8, 2013

(65) Prior Publication Data

US 2013/0188876 A1 Jul. 25, 2013

Related U.S. Application Data

(63) Continuation of application No. 12/198,136, filed on Aug. 26, 2008, now Pat. No. 8,422,788.

(51) Int. Cl.
*G06K 9/46* (2006.01)
*G06K 9/66* (2006.01)
*G06T 3/60* (2006.01)
*G06K 9/32* (2006.01)

(52) U.S. Cl.
CPC .............. *G06T 3/60* (2013.01); *G06K 9/3275* (2013.01); *G06K 9/4604* (2013.01)

(58) Field of Classification Search
USPC ......................................... 382/199, 289, 296
See application file for complete search history.

(56) References Cited

U.S. PATENT DOCUMENTS

| 5,904,822 | A | 5/1999 | Casavant |
| 5,973,692 | A | 10/1999 | Knowlton et al. |
| 6,529,641 | B1 | 3/2003 | Chakraborty |
| 6,750,989 | B1 | 6/2004 | Kamada et al. |
| 6,970,607 | B2 * | 11/2005 | Jia et al. .......................... 382/296 |
| 7,456,995 | B2 | 11/2008 | Stephens |
| 7,515,772 | B2 | 4/2009 | Li et al. |
| 8,422,788 | B2 * | 4/2013 | Demandolx et al. ........... 382/190 |
| 2003/0016883 | A1 | 1/2003 | Baron |
| 2004/0184674 | A1 * | 9/2004 | Lim et al. ....................... 382/275 |
| 2004/0252912 | A1 | 12/2004 | Yang |
| 2005/0078192 | A1 | 4/2005 | Sakurai et al. |

(Continued)

FOREIGN PATENT DOCUMENTS

CN 1581232 A 2/2005

OTHER PUBLICATIONS

Canny, "A Computational Approach to Edge Detection", IEEE Transactions on Pattern Analysis and Machine Intelligence, vol. PAMI-8, No. 6, Nov. 1986, pp. 679-698.

(Continued)

*Primary Examiner* — John Strege
(74) *Attorney, Agent, or Firm* — Bryan Webster; Kate Drakos; Micky Minhas

(57) ABSTRACT

Tilt is reduced or eliminated in captured digital images. Edges in a first image are detected. Angles corresponding to the detected edges are determined. A dominant angle is selected from the determined angles. The first image is rotated according to the selected dominant angle to generate a second image. The second image is a de-tilted version of the first image.

20 Claims, 13 Drawing Sheets

(56) References Cited

U.S. PATENT DOCUMENTS

2005/0264652 A1 12/2005 Liang
2008/0181512 A1* 7/2008 Gavin et al. .................. 382/209
2008/0186333 A1 8/2008 Prakash et al.
2010/0054595 A1 3/2010 Demandolx et al.

OTHER PUBLICATIONS

Serra J.,"Image Analysis and Mathematical Morphology Volume 1", Academic Press, 1982, 610 pages.
Kocsis, "Straighten Curved Objects", retrieved from <http://rsbweb.nih.gov/ij/plugins/straighten.html>> on Jun. 30, 2008, 4 pages.
"Straighten a slanted photo", Dec. 20, 2005, 5 pages.
"STOIK Imagic 4.0.2 .4", retrieved from <http://www.softpedia.com/geUMultimedia/Graphic/Graphic-Viewers/STOIK-Imagic.shtml> on Jun. 30, 2008, 3 Pages.
"Document Image Processing:", retrieved from <http://www.leadtools.com/SDK/DocumenUDocument-Image-Processing-Doc-Clean.htm> on Jun. 30, 2008, 2 pages.
"Adobe Photoshop", Lead Technologies, Inc., 2005, 7 pages.
International Search Report and Written Opinion for International Application No. PCT/US2009/054225 dated Mar. 12, 2010, 11 pages.
Office Action Received in Israel Patent Application No. 209825, Mail Date: Nov. 5, 2014, 6 Pages.
Office Action received for Israeli Patent Application No. 209825, mailed on May 11, 2014, 3 pages of Israeli Office action and 3 Pages of English translation.
Office Action received for Chinese Patent Application No. 200980134181.4, mailed on Nov. 28, 2012, 8 ages of Chinese Office action and 3 Pages of English translation.

* cited by examiner

2202 calculate an angle between a first axis of the first image and the long axis
determined for the candidate edge object corresponding to the detected edge object

706

2400

AUTOMATIC IMAGE STRAIGHTENING

This application is a continuation of allowed U.S. application Ser. No. 12/198,136, filed on Aug. 26, 2008, which is incorporated by reference herein in its entirety.

BACKGROUND

Digital photography is a type of photography that uses digital technology to make digital images of subjects. Digital image capturing devices, such as digital cameras, include sensors that capture images in a digital form. Examples of such sensors include charge coupled devices (CCDs) and CMOS (complementary metal-oxide-semiconductor) sensors. Digital images can be displayed, printed, stored, manipulated, transmitted, and archived without chemical processing.

A problem in digital photography is that a user taking a picture may undesirably tilt the camera while taking the picture. As a result, the resulting captured image may be undesirably rotated within the image plane. Some computer applications enable the in-plane rotation (herein referred to as "tilt") to be removed from a captured image by enabling the user to manually input a tilt angle (either numerically or with the help of the mouse pointer). The computer application rotates the captured image by the angle input by the user to remove the undesired tilt.

When textual documents are scanned, sometimes the scanner receives the documents in a tilted position. As a result, the scanned versions of text documents may include tilted text (i.e., oriented at an angle). Some applications enable tilt to be automatically removed from scanned text documents. This feature is typically referred to as "deskew," and is available in some optical character recognition (OCR) applications, for example. However, such applications cannot perform deskew on natural images that include non-textual image features. For instance, such applications cannot perform deskew on digital images captured by digital image capturing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Tilt is reduced or eliminated from digital images that include non-textual image features. Such tilt in a digital image may undesirably result from the tilting of an image capturing device used to capture the digital image. To reduce the tilt, the digital image is analyzed to determine a dominant edge direction in the digital image. An angle corresponding to the dominant edge direction is selected as a dominant angle of the digital image. Pixels of the digital image are rotated by an amount of the dominant angle to generate a de-tilted digital image.

Methods for reducing tilt in digital images are described. In one method, edges in a first image are detected. Angles corresponding to the detected edges are determined. A dominant angle is selected from the determined angles. The first image is rotated according to the selected dominant angle to generate a second image. The second image is a de-tilted version of the first image.

In an implementation, the plurality of edges in the first image may be detected by: generating a grayscale image data set from a set of data representative of the digital image, filtering the grayscale image data set, performing edge enhancement on the filtered grayscale image data set to generate an edge enhanced image data set, and detecting a plurality of candidate edge objects in the edge enhanced image data set.

In one implementation, detecting the plurality of candidate edge objects in the edge enhanced image data set may include: detecting an edge junction in a first candidate edge object, dividing the first candidate edge object at the detected edge junction into second and third candidate edge objects, and replacing the first candidate edge object with the second and third candidate edge objects in the plurality of candidate edge objects.

In another implementation, detecting the plurality of candidate edge objects in the edge enhanced image data set may include: segmenting the edge enhanced image data set into a plurality of pixel regions, separately analyzing each pixel region of the plurality of pixel regions to determine whether candidate edge objects are present, and configuring the detected plurality of candidate edge objects to include any candidate edge objects determined to be present during said analyzing.

In an implementation, detecting the plurality of edges in the first image may further include: for each candidate edge object of the plurality of candidate edge objects, determining a long axis and a short axis, calculating an eccentricity based on the determined long axis and short axis, and including the candidate edge object as a detected edge object in the detected plurality of edges if the calculated eccentricity is greater than a predetermined minimum eccentricity threshold value.

In a further implementation, determining the plurality of angles corresponding to the determined plurality of edges may include: for each detected edge object in the detected plurality of edges, calculating an angle between a first axis of the first image and the long axis determined for the candidate edge object corresponding to the detected edge object.

In a still further implementation, selecting a dominant angle from the determined plurality of angles may include: calculating a weight value for each calculated angle based at least on the eccentricity calculated for the corresponding candidate edge object, and generating a histogram that maps calculated weight values versus calculated angles for the detected edge objects of the detected plurality of edges.

In a still further implementation, selecting a dominant angle from the determined plurality of angles may further include: selecting a calculated angle of the histogram corresponding to a greatest cumulative calculated weight value to be the dominant angle.

Systems for reducing tilt in digital images are also described. For instance, in one implementation, an image tilt reduction system includes an edge detector, an angle determiner, a dominant angle selector, and an image rotator. The edge detector is configured to detect a plurality of edges in a first image. The angle determiner is configured to determine a plurality of angles corresponding to the determined plurality of edges. The dominant angle selector is configured to determine a dominant angle from the determined plurality of angles. The image rotator is configured to rotate the first image according to the selected dominant angle to generate a second image.

In an implementation, the edge detector includes an image color format converter, an image filter, an edge enhancer, and a candidate edge object detector. The image color format converter is configured to convert a set of data representative of the digital image to a grayscale image data set. The image filter is configured to filter the grayscale image data set. The edge enhancer is configured to perform edge enhancement on the filtered grayscale image data set to generate an edge enhanced image data set. The candidate edge object detector is configured to detect a plurality of candidate edge objects in the edge enhanced image data set.

In an implementation, the candidate edge object detector includes an edge object identifier and an edge object splitter. The edge object identifier is configured to detect candidate edge objects in the edge enhanced image data set. The edge object splitter is configured to scan candidate edge objects in the edge enhanced image data set to detect edge junctions, and to divide each candidate edge object having a detected edge junction at the detected edge junction into second and third candidate edge objects.

In an alternative implementation, the candidate edge object detector includes an image segmenter and a pixel region analyzer. The image segmenter is configured to segment the edge enhanced image data set into a plurality of pixel regions. The pixel region analyzer is configured to analyze each pixel region of the plurality of pixel regions to determine the presence of candidate edge objects, and to include in the plurality of candidate edge objects any candidate edge objects determined to be present.

In a further implementation, the edge detector further includes an edge filter. The edge filter is configured to determine a long axis and a short axis for a candidate edge object, and to calculate an eccentricity based on the determined long axis and short axis. The edge filter is further configured to include the candidate edge object in the detected plurality of edges as a detected edge object if the calculated eccentricity is greater than a predetermined minimum eccentricity threshold value.

In a further implementation, the angle determiner is configured to calculate for the detected edge object an angle between a first axis of the first image and the determined long axis determined for the candidate edge object corresponding to the detected edge object.

In a still further implementation, the dominant angle selector includes a weight value calculator, a histogram generator, and a dominant angle identifier. The weight value calculator is configured to calculate a weight value for each calculated angle based at least on the eccentricity calculated for the corresponding candidate edge object. The histogram generator is configured to generate a histogram that maps calculated weight value versus calculated angle for each detected edge object of the detected plurality of edges. The dominant angle identifier is configured to select an angle of the histogram corresponding to a greatest cumulative calculated weight value to be the dominant angle.

Computer program products are also described herein that enable reduction of tilt in images as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
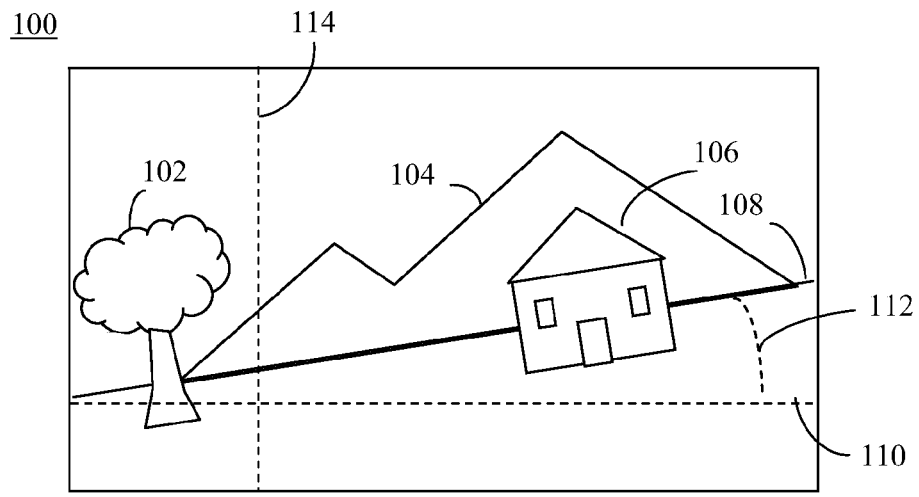
FIG. 1 shows an example digital image that includes image tilt.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Examples of Tilt in Digital Images

Digital photography is a type of photography that uses digital technology to capture digital images of subjects. Many types of devices are capable of capturing digital images, including digital cameras, cell phones, smart phones, camcorders, web cameras, etc. Furthermore, scanners exist that are configured to capture digital images by scanning images in digital form. Digital images captured by any of these devices can be displayed, printed, stored, manipulated, transmitted, and archived without chemical processing.

Problems exist in digital photography and scanner technology with regard to undesirably rotated images. For example, with respect to digital photography, a user taking a picture may undesirably tilt the camera while taking the picture. With respect to a scanner, a document that includes an image may be undesirably tilted when scanned. FIG. 1 shows an example digital image 100 captured by a digital image capturing device, and displayed by a display. As shown in FIG. 1, image 100 is a captured image of an example landscape, and includes a tree 102, mountains 104, a house 106, and a horizon 108. Image 100 is typically displayed as a two-dimensional array of image pixels. Because the image capturing device (e.g., camera, scanner, etc.) captured image 100 in a rotated fashion, image 100 is a tilted image. Image 100 is recognizable as being tilted because the contents of image 100 are tilted with respect to their actual physical orientation in the real world. For instance, as shown in FIG. 1, horizon 108 is tilted from a horizontal axis 110 of image 100 by a tilt angle 112, and tree 102, mountains 104, and house 106 are correspondingly tilted. Tilt angle 112 may be any angle between −45 and +45 degrees.

Note that "landscape" and "portrait" layout images may be captured by image capturing devices. For instance, a camera may be oriented horizontally by a user to capture "landscape" layout images, or may be oriented vertically by the user (turned 90 degrees from the horizontal orientation) to capture "portrait" layout images. The image capturing device orientation is taken into account to determine whether any existing tilt in an image is to be corrected to align the image with respect to a horizontal axis or to a vertical axis. The tilt angle may be defined with respect to the closest axis. For instance, referring to image 100 in FIG. 1, if tilt angle 112 is between −45 and +45 degrees, image 100 may be considered to be a landscape layout image. Alternatively, if tilt angle 112 is between +45 and +135 degrees with respect to horizontal axis 110 (between −45 and +45 degrees with respect to vertical axis 114), image 100 may be considered to be a "portrait" layout image.

Figure 2:
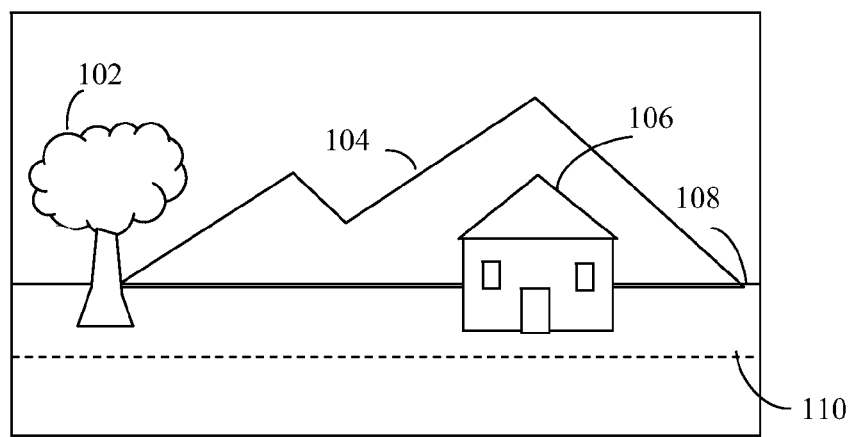
FIG. 2 shows a digital image that is a de-tilted version of the digital image shown in FIG. 1.

In either case, the user may desire to have the captured image "rotated" to the appropriate axis to remove the tilt present in the image. For example, FIG. 2 shows a "de-tilted" image 200. Image 200 is a version of image 100, with tilt angle 112 removed. For example, to generate image 200, the image pixels forming image 100 may be rotated around a point (e.g., a center pixel) in image 100 by the amount of tilt angle 112 to align image 100 (e.g., horizon 108) with horizontal axis 110. As shown in FIG. 2, image 200 is rotated so that horizon 108 is parallel to horizontal axis 110 of image 200 because image 100 is a landscape layout image. If image 100 is a "portrait" layout image, and tilt angle 112 is between +45 and +135 degrees, image 200 is rotated by the amount of tilt angle 112 minus 90 degrees so that horizon 108 is aligned parallel to vertical axis 114.

Some conventional computer applications enable the tilt to be removed from a captured image by enabling the user to manually input a tilt angle (either numerically or with the help of the mouse pointer). The computer application rotates the captured image by the amount of input tilt angle to remove the undesired tilt. Although devices exist that can perform "deskew" with respect to text, conventional computer applications do not exist that enable "automatic" removal of tilt from a captured image, where the user does not have to manually input a tilt angle or to otherwise intervene to enable the tilt to be removed.

Embodiments of the present invention overcome these deficiencies of conventional computer applications, enabling tilt that exists in digital images to be automatically reduced (e.g., without needing user input). Example embodiments of the present invention are described in the following section.

III. Example Tilt Reduction System/Device Embodiments

Embodiments for reducing tilt in digital images are described in this section and the following sections. The example embodiments described herein are provided for illustrative purposes, and are not limiting. Although some embodiments are described below in terms of the RGB color model, such embodiments may be adapted to any type of color model, including YUV, HSV, YIQ, Lab, and CIECAM. Furthermore, additional structural and operational embodiments, including modifications/alterations, will become apparent to persons skilled in the relevant art(s) from the teachings herein.

Figure 3:
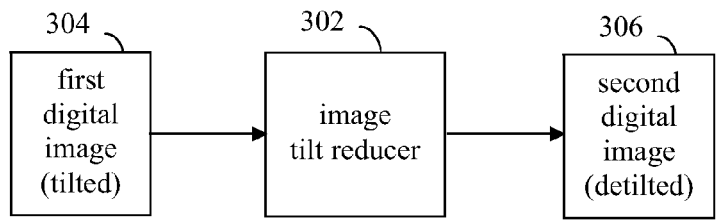
FIG. 3 shows a block diagram of an example system for reducing image tilt, according to an embodiment of the present invention.

FIG. 3 shows an image tilt reduction system 300, according to an example embodiment. As shown in FIG. 3, system 300 includes an image tilt reducer 302. Image tilt reducer 302 receives a first digital image data 304, which represents an image that includes image tilt. For instance, digital image data 304 may be representative of digital image 100 shown in FIG.

1. Digital image data 304 may have any suitable format, including being in the form of image data, an image file, and/or other form. Digital image data 304 may include image data in the form of RGB (red, green, blue), CYGM (cyan, yellow, green, magenta), RGBE (red, green, blue, emerald), YUV (luminance, first chrominance, second chrominance), or other color model mentioned elsewhere herein or otherwise known.

Image tilt reducer 302 is configured to reduce an amount of tilt in the image represented by digital image data 304. As shown in FIG. 3, image tilt reducer 302 generates a second digital image data 306, which is a de-tilted version of first digital image data 304. Image tilt reducer 302 may be configured to generate second digital image data 306 to have the same image format as first digital image data 304, or to have a different image format. Image tilt reducer 302 may be configured as hardware, software, firmware, or any combination thereof, to perform its functions. Example embodiments for image tilt reducer 302 are described further below.

Figure 4:
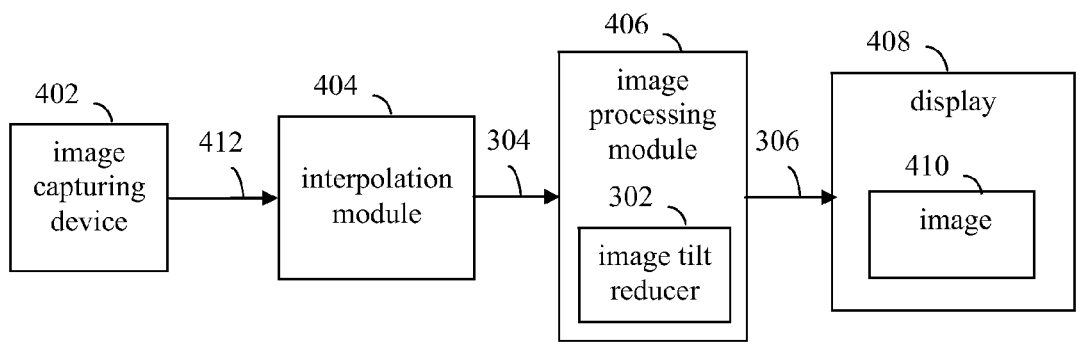
FIG. 4 shows a block diagram of a digital image capturing system that includes an image tilt reducer, according to an example embodiment of the present invention.

Image tilt reducer 302 may be implemented in various devices and/or applications, in embodiments. For example, in an embodiment, image tilt reducer 302 may be implemented in a mobile device that is configured to capture images. In such an embodiment, image tilt reducer 302 may be enabled to reduce tilt in images captured by the mobile device prior the images being transmitted from the mobile device. For instance, FIG. 4 shows a digital image capturing system 400, according to an example embodiment. As shown in FIG. 4, system 400 includes an image capturing device 402, an interpolation module 404, an image processing module 406, and a display 408. Image capturing device 402, interpolation module 404, image processing module 406, and display 408 may be present together at a single device, including a stationary device such as a scanner, or a mobile device such as a digital camera, a cell phone, a smart phone, a camcorder, etc., or may be located in two or more separate devices. For example, in one implementation, image capturing device 402, interpolation module 404, image processing module 406, and display 408 may be included in a single device. In another implementation, image capturing device 402 and interpolation module 404 may be included in a first device (e.g., a digital camera), and image processing module 406 and display 408 may be included in a second device (e.g., a computer). The elements of system 400 are described as follows.

Image capturing device 402 may be a camera or other device that includes sensors configured to capture images in a digital form. Examples of such sensors include charge coupled devices (CCDs) and CMOS (complementary metal-oxide-semiconductor) sensors. For instance, image capturing device 402 may include a two-dimensional array of sensor elements organized into rows and columns. Such a sensor array may have any number of pixel sensors, including thousands or millions of pixel sensors. Each pixel sensor of the sensor array may be configured to be sensitive to a specific color, or color range, such as through the use of color filters. In one example, three types of pixel sensors may be present, including a first set of pixel sensors that are sensitive to the color red, a second set of pixel sensors that are sensitive to green, and a third set of pixel sensors that are sensitive to blue. One common example distribution of pixel sensors that are sensitive to red, green, or blue is called a Bayer pattern. In a Bayer pattern, 50% of the pixel sensors are configured to be sensitive to green, 25% of the pixel sensors are configured to be sensitive to red, and 25% of the pixel sensors are configured to be sensitive to blue. As shown in FIG. 4, image capturing device 402 generates Bayer pattern image data 412, which includes image data formatted according to the Bayer pattern.

Interpolation module 404 receives Bayer pattern image data 412. Interpolation module 404 is configured to generate image data according to a RGB (red-green-blue) color model (also known as "color space"), by interpolating red, green, and blue pixel data values from Bayer pattern image data 412 for each pixel position. In other words, interpolation module 404 is configured to generate a full pixel array (e.g., an array the size of the sensor array of device 402) for each of the colors of red, green, and blue. For instance, interpolation module 404 may perform the pixel interpolation using a class of methods commonly known as "demosaicers". As shown in FIG. 4, interpolation module 404 generates first digital image data 304, which includes image data formatted according to the RGB (red-green-blue) color model. In this example, first digital image data 304 includes a full two-dimensional array of image pixel data for each of red, green, and blue, referred to respectively as a red channel, a green channel, and a blue channel.

Note that device 402 may be configured to generate image data formatted according to color combinations other than red, green, and blue, including CYGM (cyan, yellow, green, magenta) or a RGBE (red, green, blue, emerald).

As shown in FIG. 4, image processing module 406 receives first digital image data 304. Image processing module 406 is configured to perform image processing on first digital image data 304. For example, image processing module 406 may be configured to perform image scaling, color correction, denoising, etc., on first digital image data 304. Furthermore, as shown in FIG. 4, image processing module 406 includes image tilt reducer 302. Image tilt reducer 302 is configured to reduce tilt in images processed by image processing module 406. As shown in FIG. 4, image processing module 406 generates second digital image data 306. Display 408 receives second digital image data 306, and generates an image 410 corresponding to second digital image data 306 for display. For example, display 408 may display an image similar to image 200 shown in FIG. 2, which had image tilt reduction performed by image tilt reducer 302.

Note that interpolation module 404 and image processing module 406 may be implemented in hardware, software, firmware, or any combination thereof. For example, interpolation module 404 and image processing module 406 may be implemented as computer code configured to be executed in one or more processors. Alternatively, interpolation module 404 and image processing module 406 may be implemented as hardware logic/electrical circuitry.

Figure 5:
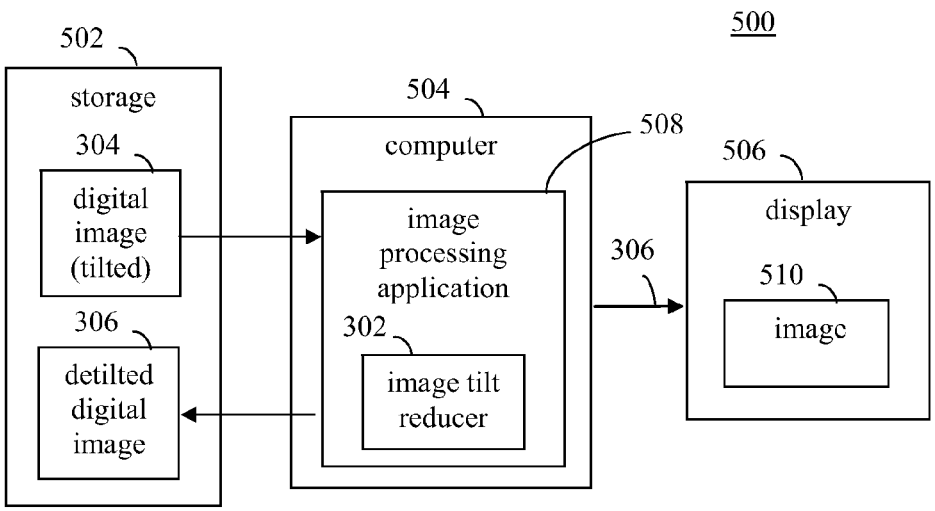
FIG. 5 shows a block diagram of a computer system that includes an image tilt reducer, according to an example embodiment of the present invention.

Referring back to FIG. 3, in an embodiment, image tilt reducer 302 may be implemented in a computer system that may or may not be stationary, and may or may not be configured to capture images. For example, image tilt reducer 302 may be implemented in an image processing application that runs on a computer, such as Adobe® Photoshop®, which is published by Adobe Systems Inc. of San Jose, Calif., Picasa™, which is published by Google, Inc. of Mountain View, Calif., or other commercially available or proprietary image processing application. In such an embodiment, image tilt reducer 302 may be enabled to reduce tilt in images captured by the computer system or in images captured by other devices (e.g., mobile devices). For instance, FIG. 5 shows a computer system 500, according to an example embodiment. As shown in FIG. 5, system 500 includes storage 502, a computer 504, and a display 504. The elements of system 500 are described as follows.

As shown in FIG. 5, storage 502 is coupled to computer 504. Storage 502 is one or more storage devices that perform a storage function for computer 504. For instance, storage 502 may include one or more of any type of storage mechanism, including a hard disk drive, an optical disc drive, a memory device such as a RAM device, a ROM device, etc., and/or any other suitable type of storage medium. Storage 502 stores digital images, including first digital image data 304, which may have been captured by an image capturing device of computer system 500 (not shown in FIG. 5) or by other image capturing device.

As shown in FIG. 5, computer 504 includes an image processing application 508. Image processing application 508 is configured to enable display of images stored in storage 502 to a user of computer 504. Computer 504 may access storage 502 to retrieve first digital image data 304 for image processing application 508. Image processing application 508 may be configured to perform image processing on first digital image data 304. For example, image processing application 508 may be configured to perform image scaling, color correction, denoising, etc., on first digital image data 304. Furthermore, as shown in FIG. 5, image processing application 508 includes image tilt reducer 302. Image tilt reducer 302 is configured to reduce tilt in images processed by image processing application 508. As shown in FIG. 5, image processing application 508 generates second digital image data 306. Display 506 receives second digital image data 306, and generates an image 510 corresponding to second digital image data 306 for display. For example, display 506 may display an image similar to image 200 shown in FIG. 2, which had image tilt reduction performed by image tilt reducer 302.

Computer 504 may be any type of computer, including mobile (e.g., laptop, notebook, handheld, etc.) or desktop. Note that image processing application 508 may be implemented in hardware, software, firmware, or any combination thereof. For example, image processing application 508 may be implemented as computer code configured to be executed in one or more processors. Alternatively, image processing application 508 may be implemented as hardware logic/electrical circuitry.

Example embodiments for image tilt reducer 302 are described in the following section.

IV. Example Methods and Systems for Image Title Reducer

Image tilt reducer 302 shown in FIG. 3 may be implemented in various ways. The example embodiments described herein are provided for illustrative purposes, and are not limiting. Furthermore, additional structural and operational embodiments, including modifications/alterations, will become apparent to persons skilled in the relevant art(s) from the teachings herein.

Figure 6:
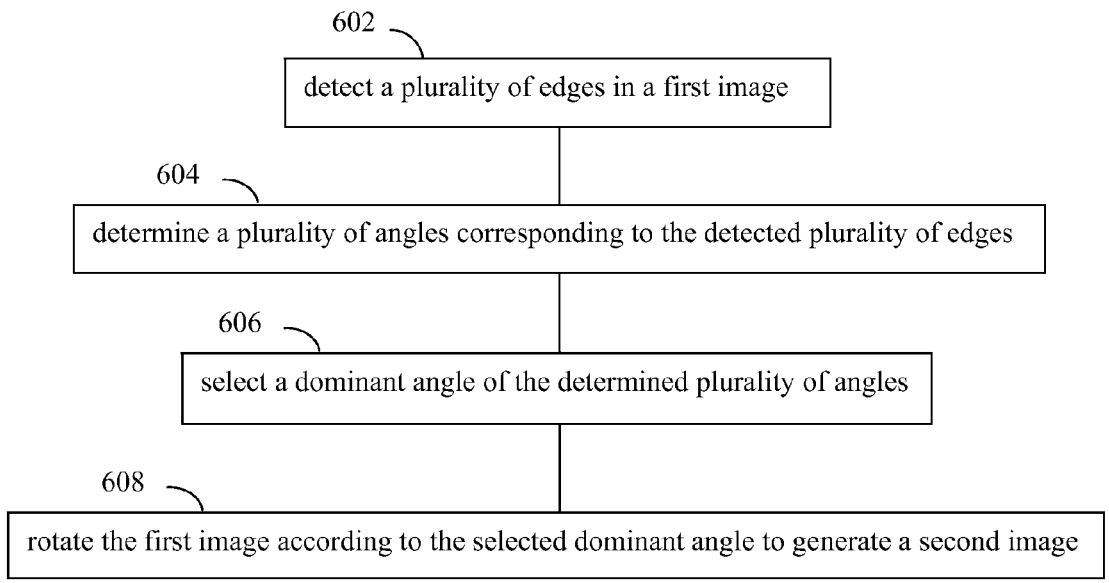
FIG. 6 shows a flowchart for reducing tilt in an image, according to an example embodiment.
Figure 7:
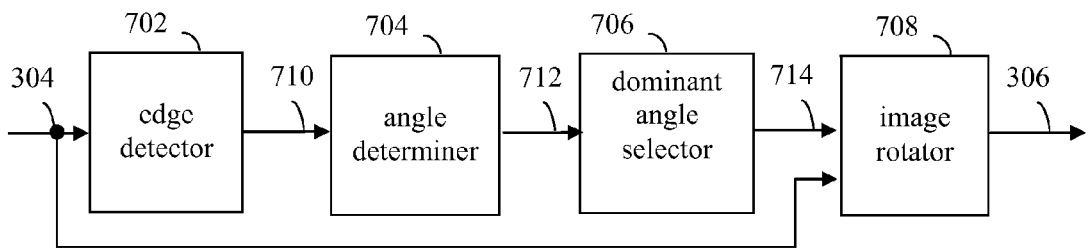
FIG. 7 shows a block diagram of an image tilt reducer, according to an example embodiment of the present invention.

For example, FIG. 6 shows a flowchart 600 for reducing tilt in an image, according to an example embodiment. Flowchart 600 is described below with respect to FIG. 7. FIG. 7 shows a block diagram of an image tilt reducer 700, according to an example embodiment. Image tilt reducer 700 is an example of image tilt reducer 302 shown in FIG. 3. As shown in FIG. 7, image tilt reducer 700 includes an edge detector 702, an angle determiner 704, an angle selector 706, and an image rotator 708. The steps of flowchart 600 do not necessarily need to be performed in the order shown in FIG. 6. Other structural and operational embodiments will be apparent to persons skilled in the relevant art(s) based on the discussion regarding flowchart 600. Flowchart 600 is described as follows.

In step 602, a plurality of edges is detected in a first image. For example, in an embodiment, edge detector 702 may be configured to detect a plurality of edges in an image, such as image 100 shown in FIG. 1. As shown in FIG. 7, edge detector 702 receives first image data 304, which contains image data representative of a first image. In an embodiment, edge detector 702 may be configured to detect edges in the first image by analyzing first image data 304, including detecting edges in first image data 304 that correspond to any number of objects appearing in the first image. For instance, referring to the example of FIG. 1, edge detector 702 may detect the outlines of each of tree 102, mountains 104, house 106, and/or horizon 108, and may consider each detected outline to be one or more edges present in image 100. Other features of tree 102, mountains 104, house 106, and/or horizon 108 may additionally and/or alternatively be detected as edges by edge detector 702. Example embodiments for edge detector 702 are described in further detail below. As shown in FIG. 7, edge detector 702 generates a detected plurality of edges 710.

In step 604, a plurality of angles corresponding to the detected plurality of edges is determined. For example, in an embodiment, angle determiner 704 may be configured to determine a plurality of angles corresponding to the plurality of edges detected by edge detector 702. As shown in FIG. 7, angle determiner 704 receives detected plurality of edges 710. In an embodiment, angle determiner 704 may be configured to determine an angle for each edge present in plurality of edges 710. For instance, referring to the example of FIG. 1, angle determiner 704 may determine an angle corresponding to each edge corresponding to the outlines and/or other features of tree 102, mountains 104, house 106, and/or horizon 108. Each angle may be determined between the corresponding edge and horizontal axis 110 by angle determiner 704, for instance. Example embodiments for angle determiner 704 are described in further detail below. As shown in FIG. 7, angle determiner 704 generates a determined plurality of angles 712.

In step 606, a dominant angle of the determined plurality of angles is determined. For example, in an embodiment, dominant angle selector 706 may be configured to determine a dominant angle corresponding to the plurality of angles determined by angle determiner 704. As shown in FIG. 7, dominant angle selector 706 receives determined plurality of angles 712, and generates a determined dominant angle 714. In an embodiment, angle determiner 704 may be configured to determine the dominant angle to be the most frequently occurring angle in determined plurality of angles 712. In an embodiment, the most frequently occurring angle may have to occur more often than other angles of determined plurality of angles 712 by a predetermined amount to be considered a dominant angle. In an embodiment, if multiple angles are determined to frequently occur in determined plurality of angles 712, dominant angle selector 706 may be configured to select one of the multiple angles to be the dominant angle, may be configured to enable a user to select one of the multiple angles to be the dominant angle, or may be configured to indicate to the user that a dominant angle could not be determined. For instance, referring to the example of FIG. 1, dominant angle selector 706 may determine the dominant angle to be the angle corresponding to horizon 108. Example embodiments for dominant angle selector 706 are described in further detail below. As shown in FIG. 7, dominant angle selector 706 generates a selected dominant angle 708.

In step 608, the first image is rotated according to the selected dominant angle to generate a second image. For example, in an embodiment, image rotator 708 may be configured to rotate the first image according to the dominant angle selected by dominant angle selector 706. As shown in FIG. 7, image rotator 708 receives selected dominant angle 708 and first image data 304. Image rotator 708 is configured to rotate first image data 304 by an amount of selected dominant angle 708 to generate second image data 306. As described above, second image data 306 is a de-tilted version of first digital image data 304, and thus enables an image (e.g., image 200 shown in FIG. 2) generated from second image data 306 to be displayed that is a de-tilted version of another image (e.g., image 100 shown in FIG. 1). Image rotator 708 may be configured to perform image rotation in any manner, including performing image rotation according to any image rotation technique known to persons skilled in the relevant art(s). For example, image rotator 708 may perform regular rotation resampling, such as bicubic resampling, to compensate for the determined angle of tilt (selected dominant angle 708), as would be known to persons skilled in the relevant art(s). Optionally, the image corresponding to second image data 306 may be automatically cropped to a largest rectangle that best fits within the original image area to eliminate the four "blank" triangles that may be generated by typical image rotation, if desired.

Note that edge detector 702, angle determiner 704, angle selector 706, and image rotator 708 may each be implemented in hardware, software, firmware, or any combination thereof. For example, any one or more of edge detector 702, angle determiner 704, angle selector 706, and/or image rotator 708 may be implemented as computer code configured to be executed in one or more processors. Alternatively, any one or more of edge detector 702, angle determiner 704, angle selector 706, and/or image rotator 708 may be implemented as hardware logic and/or electrical circuitry.

The following subsections describe example embodiments for flowchart 600 and for edge detector 702, angle determiner 704, angle selector 706, and image rotator 708 of system 700.

A. Example Edge Detection Embodiments

Figure 8:
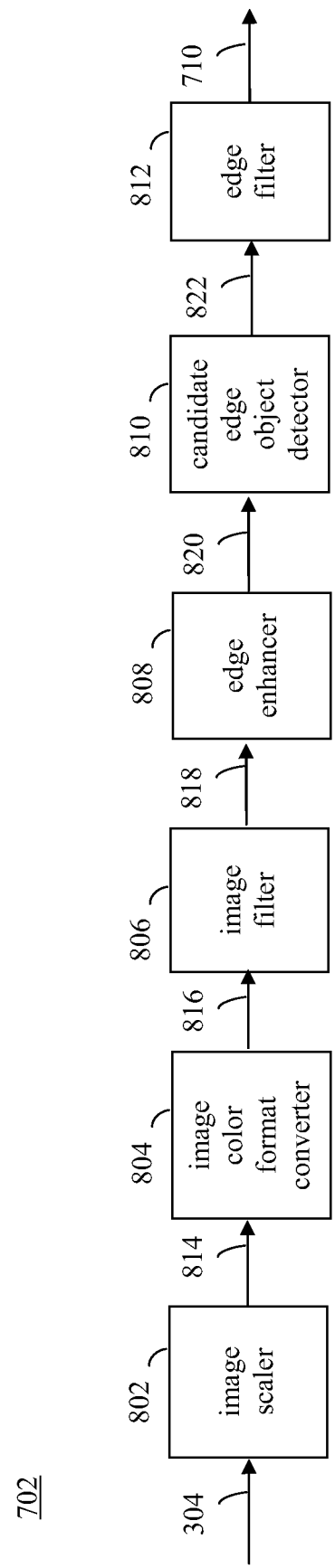
FIG. 8 shows a block diagram of an edge detector, according to an example embodiment of the present invention.
Figure 9:
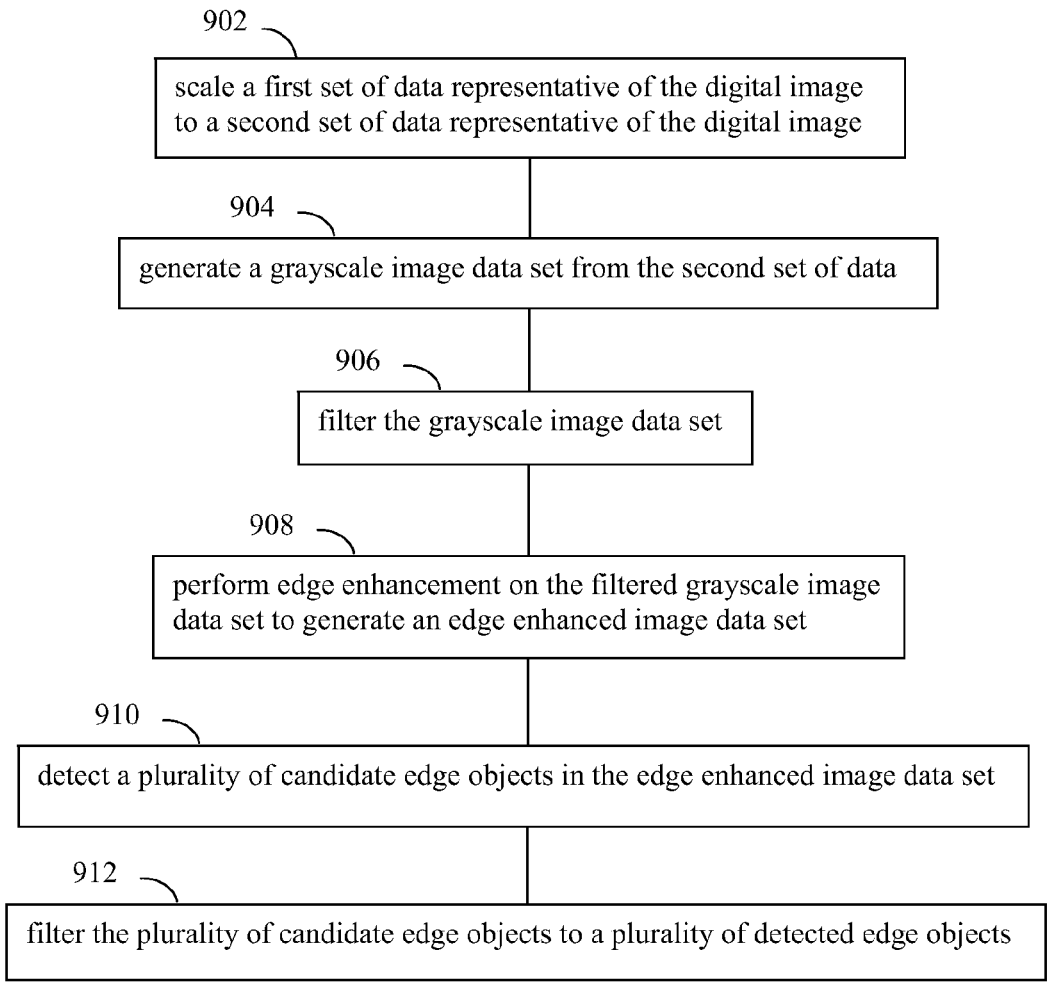
FIG. 9 shows a flowchart for detecting edges in an image, according to an example embodiment of the present invention.

Edge detector 702 shown in FIG. 7 may be implemented in various ways. For instance, FIG. 8 shows a block diagram of edge detector 702, according to an example embodiment. As shown in FIG. 8, edge detector 702 includes an image scaler 802, an image color format converter 804, an image filter 806, an edge enhancer 808, a candidate edge object detector 810, and an edge filter 812. Edge detector 702 shown in FIG. 8 is described with respect to FIG. 9. FIG. 9 shows a flowchart 900 for detecting edges in an image, according to an example embodiment. All of the steps of flowchart 900 shown in FIG. 9 do not necessarily need to be performed in all embodiments, and in some embodiments, may be performed in an order other than shown in FIG. 9. Image scaler 802, image color format converter 804, image filter 806, edge enhancer 808, candidate edge object detector 810, and edge filter 812 may be implemented in hardware, software, firmware, or any combination thereof. Other structural and operational embodiments will be apparent to persons skilled in the relevant art(s) based on the discussion regarding flowchart 900. Flowchart 900 is described as follows.

Flowchart 900 begins with step 902. In step 902, a first set of data representative of the digital image is scaled to a second set of data representative of the digital image. For example, in an embodiment, image scaler 802 shown in FIG. 8 may be configured to scale a first set of data representative of a digital image to a second set of data representative of the digital image. Image scaler 802 is optional. In an embodiment, image scaler 802 may be present to resize a digital image, including increasing or decreasing the image size, to a size that is easier and/or more convenient to be processed. As shown in FIG. 8, image scaler 802 receives first image data set 304. Image scaler 802 may be configured to resize the image corresponding to first image data set 304 to a have a predetermined pixel length and a predetermined pixel width. For instance, image scaler 802 may be configured to resize an image such that its maximal dimension (width or height) has a maximum number of 1,152 pixels, or other predetermined number of pixels. Image scaler 802 may be configured to perform image scaling according to any suitable scaling algorithm or technique, as would be known to persons skilled in the relevant art(s). As shown in FIG. 8, image scaler 802 generates a scaled image data set 814.

In step 904, a grayscale image data set is generated from the second set of data. For example, in an embodiment, image color format converter 804 shown in FIG. 8 may be configured to generate a grayscale image data set 816 from scaled image data set 814. As shown in FIG. 8, image color format converter 804 receives scaled image data set 814. When present, image color format converter 804 may be used to convert color image data to grayscale image data to enable edges in the image to be more easily detected. Image color format converter 804 may be configured to perform the conversion according to any suitable conversion algorithm or technique, as would be known to persons skilled in the relevant art(s).

For example, in an embodiment, scaled image data set 814 may include scaled image data in a RGB color format. In such case, scaled image data set 814 may include a scaled array of pixel data for each of red, green, and blue color channels. The RGB color format arrays forming scaled image data set 814 may be converted to a gray level image by image color format converter 804 according to a common luminance formula, such as Equation 1 shown below. Equation 1 can be used to calculate a grayscale pixel value for each pixel of scaled image data set 814:

$$\text{Pixel luminance} = 0.299 \times RPV + 0.587 \times GPV + 0.114 \times BPV \quad \text{Equation 1}$$

where
  RPV=the red pixel value for the pixel,
  GPV=the green pixel value for the pixel, and
  BPV=the blue pixel value for the pixel.
In an embodiment, image color format converter 804 may be configured to perform Equation 1 on each pixel of scaled image data set 814 to generate grayscale image data set 816.

In step 906, the grayscale image data set is filtered. For example, in an embodiment, image filter 806 shown in FIG. 8 may be configured to filter grayscale image data set 816 to generate a filtered image data set 818. As shown in FIG. 8, image filter 806 receives grayscale image data set 816. When present, image filter 806 may be used to filter out/reduce non-significant image details and/or noise from an image, in order to enable edges in the image to be more easily detected. Image filter 806 may be configured to perform image data filtering according to any suitable conversion algorithm or technique, as would be known to persons skilled in the relevant art(s).

Figure 10:
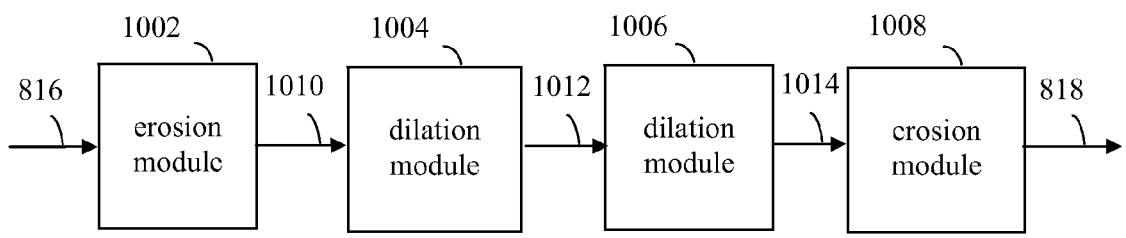
FIG. 10 shows a block diagram of an image filter, according to an example embodiment of the present invention.

In an embodiment, image filter 806 may use mathematical morphology techniques to filter an image, which will be known to persons skilled in the image processing arts. For instance, FIG. 10 shows a block diagram of image filter 806, according to an example embodiment. As shown in FIG. 10, image filter 806 includes a first erosion module 1002, a first dilation module 1004, a second dilation module 1006, and a second erosion module 1008. First and second erosion modules 1002 and 1008 may be configured to perform an erosion function according to any window size, and first and second dilation modules 1004 and 1006 may be configured to perform a dilation function according to any window/operator size. For instance, a window size of 3 by 3 pixels may be used for both of the erosion and dilation functions. Erosion and dilation functions are known to persons skilled in the relevant art(s).

As shown in FIG. 10, first erosion module 1002 is followed by first dilation module 1004 so that erosion is performed followed by dilation. This sequence of mathematical morphology operators is known as an opening operation. This opening operation is configured to reduce/remove small bumps in an image luminance field. First erosion module 1002 receives grayscale image data set 816. First erosion module 1002 performs erosion on grayscale image data set 816, and generates a first eroded image data set 1010. First dilation module 1004 receives first eroded image data set 1010. First dilation module 1004 performs dilation on first eroded image data set 1010, and generates a first dilated image data set 1012.

As further shown in FIG. 10, second dilation module 1006 is followed by second erosion module 1008 so that dilation is performed followed by erosion. This sequence of mathematical morphology operators is known as a closing operation. This closing operation is a symmetrical operation to the preceding opening operation. The closing operation is configured to remove small holes in the image luminance field. Second dilation module 1006 receives first dilated image data set 1012. Second dilation module 1004 performs dilation on first dilated image data set 1012, and generates a second dilated image data set 1014. Second erosion module 1008 receives second dilated image data set 1014. Second erosion module 1008 performs erosion on second dilated image data set 1014, and generates filtered image data set 818.

First erosion module 1002, first dilation module 1004, second dilation module 1006, and second erosion module 1008 may be configured in hardware, software, firmware, or any combination thereof to perform their respective functions. For further description of erosion and dilation functions, refer to Serra, J., "Image Analysis and Mathematical Morphology," Academic Press, 1982, which is incorporated by reference herein in its entirety.

In step 908, edge enhancement is performed on the filtered grayscale image data set to generate an edge enhanced image data set. For example, in an embodiment, edge enhancer 808 shown in FIG. 8 may be configured to perform edge enhancement on filtered image data set 818 to generate an edge enhanced image data set 820. As shown in FIG. 8, edge enhancer 808 receives filtered image data set 818. When present, edge enhancer 808 may be used to enhance edges in an image, in order to enable edges in the image to be more easily detected. Edge enhancer 808 may be configured to perform edge enhancement according to any suitable edge enhancement algorithm or technique, as would be known to persons skilled in the relevant art(s).

Figure 11:
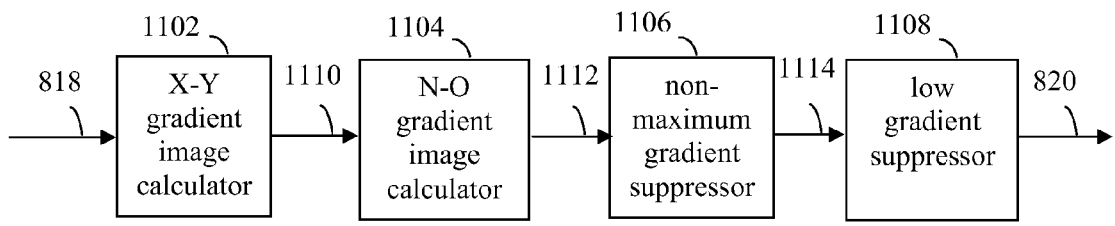
FIG. 11 shows a block diagram of an edge enhancer, according to an example embodiment of the present invention.

For example, in an embodiment, edge enhancer 808 may be configured to perform Canny edge detection. Canny edge detectors are well known to persons skilled in the relevant art(s). An example of Canny edge detection is described as follows for edge enhancer 808. For instance, FIG. 11 shows a block diagram of edge enhancer 808 as configured to perform Canny edge detection, according to an example embodiment. As shown in FIG. 11, edge enhancer 808 includes an X-Y gradient image calculator 1102, a N-O (norm and orientation) gradient image calculator 1104, a non-maximum gradient suppressor 1106, and a low gradient suppressor 1108. These elements of edge enhancer 808 in FIG. 8 are described as follows.

As shown in FIG. 11, X-Y gradient image calculator 1102 receives filtered image data set 818. X-Y gradient image calculator 1102 is configured to calculate gradient images for each of the X (horizontal) and Y (vertical) directions. In an embodiment, X-Y gradient image calculator 1102 is configured to calculate the gradient images using a ramp filter. In an embodiment, X-Y gradient image calculator 1102 may be configured to calculate an X direction gradient for each pixel of an image according to Equation 2 shown below. In Equation 2, the X direction gradient (GradientX) is shown calculated for a pixel of filtered image data set 818 having image coordinates (x,y):

$$GradientX[x,y]=RF1 \times PV[x+3,y]+RF2 \times PV[x+2,y]+RF3 \times PV[x+1,y]+RF4 \times PV[x,y] \quad \text{Equation 2}$$

where
  PV=the pixel value for the image coordinates shown in brackets [ ], and
  RF=a ramp filter factor, wherein the ramp filter=RF1, RF2, RF3, RF4.

Similarly, X-Y gradient image calculator 1102 may be configured to calculate a Y direction gradient for each pixel of an image according to Equation 3 shown below. In Equation 3, the Y direction gradient (GradientY) is shown calculated for a pixel of filtered image data set 818 having image coordinates (x,y):

$$GradientY[x,y]=RF1 \times PV[x,y+3]+RF2 \times PV[x,y+2]+RF3 \times PV[x,y+1]+RF4 \times PV[x,y] \quad \text{Equation 3}$$

The ramp filter used by X-Y gradient image calculator 1102 may be configured to have any ramp function, as desired for a particular application. For example, the ramp filter may have the following values for RF1, RF2, RF3, and RF4: −3, −1, 1, 3.

As shown in FIG. 11, X-Y gradient image calculator 1102 generates X and Y direction gradient images 1110, which includes the GradientX and GradientY values calculated for the pixels of filtered image data set 818. Note that in an embodiment, such as described above with respect to Equations 2 and 3, X-Y gradient image calculator 1102 may calculate X and Y direction gradients images 1110 to have an array size of one or more pixels reduced in each of the X and Y directions with respect to filtered image data set 818.

As shown in FIG. 11, N-O gradient image calculator 1104 receives X and Y direction gradient images 1110. N-O gradient image calculator 1104 is configured to calculate norm and orientation gradient images for X and Y direction gradient images 1110. N-O gradient image calculator 1104 may be configured to calculate norm and orientation gradient images according to any suitable algorithm or technique. For example, in an embodiment, N-O gradient image calculator 1104 may be configured to calculate a gradient norm for each pixel of an image according to Equation 4 shown below, to form a gradient norm image. In Equation 4, the gradient norm is shown calculated for a pixel of X and Y direction gradient images 1110 having image coordinates (x,y):

$$\text{Gradient norm}[x,y]=\sqrt{GradientX[x,y]^2+GradientY[x,y]^2} \quad \text{Equation 4}$$

In an embodiment, N-O gradient image calculator 1104 may be configured to calculate a gradient orientation for each pixel of an image according to Equation 5 shown below, to form a gradient orientation image. In Equation 5, the gradient orientation is shown calculated for a pixel of X and Y direction gradient images 1110 having image coordinates (x,y):

$$\text{Gradient orientation}[x,y] = \arctan(\text{GradientX}[x,y]/\text{GradientY}[x,y])$$  Equation 5

In an embodiment, N-O gradient image calculator 1104 may be configured to classify the gradient orientation for each pixel to be a selected integer from 0 to 3 corresponding to four orientation classes. The gradient orientation class may be selected to be 0 if the calculated gradient orientation (Equation 5) is closest to the horizontal direction (e.g., closest to 0 or 180 degrees). The gradient orientation class may be selected to be 1 if the calculated gradient orientation is closest to the south-west-north-east direction (e.g., closest to 45 or 225 degrees). The gradient orientation class may be selected to be 2 if the calculated gradient orientation is closest to the horizontal direction (e.g., closest to 90 or 270 degrees). The gradient orientation class may be selected to be 3 if the calculated gradient orientation is closest to the north-west-south-east direction (e.g., closest to 135 or 315 degrees). For example, the gradient orientation class may be assigned according to Table 1 shown below, which assigns a pair of opposing 45 degree regions to each class:

TABLE 1

| calculated gradient | selected gradient orientation class |
|---|---|
| between 337.5 and 22.5 degrees or between 157.5 and 202.5 degrees | 0 |
| between 22.5 and 67.5 degrees or between 202.5 and 247.5 degrees | 1 |
| between 67.5 and 112.5 degrees or between 247.5 and 292.5 degrees | 2 |
| between 112.5 and 157.5 degrees or between 292.5 and 337.5 degrees | 3 |

Note that rather than calculating a gradient orientation according to Equation 5, and selecting the gradient orientation class based on the calculated gradient orientation, a gradient orientation class may alternatively be directly selected based on a value of GradientX[x, y]/GradientY[x,y] for each pixel. For example, a table similar to Table 1 may be generated that lists ranges of GradientX[x, y]/GradientY[x,y] values in a first column, and corresponding gradient orientation classes in a second column. As a result, GradientX[x, y]/GradientY[x,y] may be calculated for each pixel of X and Y direction gradient images 1110, and the gradient orientation classes for each pixel may be selected from the table.

As shown in FIG. 11, N-O gradient image calculator 1102 generates norm and orientation gradient images 1112 for X and Y direction gradient images 1110.

As shown in FIG. 11, non-maximum gradient suppressor 1106 receives norm and orientation gradient images 1112. Non-maximum gradient suppressor 1106 is configured to suppress non-maximum gradients for norm and orientation gradient images 1112. Such suppression may be performed to thin edges in the processed image data to aid in "cleaning up" the image. Non-maximum gradient suppressor 1106 may be configured to suppress non-maximum gradients according to any suitable algorithm or technique. For example, in an embodiment, non-maximum gradient suppressor 1106 may be configured to process each pixel of the gradient norm image in norm and orientation gradient images 1112 by setting the pixel to a zero value (i.e. suppress it) if the calculated gradient norm (e.g., calculated by Equation 4) is not greater than or equal to the two nearest neighboring pixels in the gradient norm image in the orientation provided by the gradient orientation image (e.g., by Equation 5 and Table 1).

For example, if the pixel has a gradient orientation class of 0, non-maximum gradient suppressor 1106 is configured to determine whether the gradient norm of the pixel has a value that is greater than or equal to the gradient norm values of the pixels on either side of the pixel at 0 degrees and 180 degrees. If the pixel has a gradient orientation class of 1, non-maximum gradient suppressor 1106 is configured to determine whether the gradient norm of the pixel has a value that is greater than or equal to the gradient norm values of the pixels on either corner of the pixel at 45 degrees and 225 degrees. If the pixel has a gradient orientation class of 2, non-maximum gradient suppressor 1106 is configured to determine whether the gradient norm of the pixel has a value that is greater than or equal to the gradient norm values of the pixels on the top and bottom of the pixel at 90 degrees and 270 degrees. If the pixel has a gradient orientation class of 3, non-maximum gradient suppressor 1106 is configured to determine whether the gradient norm of the pixel has a value that is greater than or equal to the gradient norm values of the pixels on either corner of the pixel at 135 degrees and 315 degrees.

As shown in FIG. 11, non-maximum gradient suppressor 1106 generates suppressed norm and orientation gradient images 1114.

As shown in FIG. 11, low gradient suppressor 1108 receives suppressed norm and orientation gradient images 1114. Low gradient suppressor 1108 is configured to suppress low gradients for suppressed norm and orientation gradient images 1114. Such suppression may be performed to aid in "cleaning up" the image. Low gradient suppressor 1108 may be configured to suppress low gradients according to any suitable algorithm or technique. For example, in an embodiment, low gradient suppressor 1108 may be configured to determine the maximum gradient norm value for all gradient norm values in suppressed norm and orientation gradient images 1114. For each pixel of the gradient norm image, low gradient suppressor 1108 may be configured set the gradient norm value to zero if the gradient norm value is less than a predetermined threshold value, such as a gradient norm value that is 5% of the determined gradient norm maximum value.

Figure 12:
FIG. 12 shows an image with enhanced edges, according to an example embodiment.

As shown in FIG. 11, low gradient suppressor 1108 generates edge enhanced image data set 820, which includes norm and orientation gradient images (generated by N-O gradient image calculator 1104) that have been processed by suppressors 1106 and 1108. Edge enhanced image data set 820 is an edge enhanced version of filtered image data set 818 having a substantially cleaner edge map, where non-edge pixels are set to null values (e.g., zero values). For instance, FIG. 12 shows an image 1200 which is generated from an example of edge enhanced image data set 820. In the example of FIG. 12, image 1200 is an edge enhanced version of a digital image that shows a perspective view of a skier lying on the ground. A head 1202 of the skier is indicated in FIG. 12, as well as a ski 1204 of the skier. The digital image on which image 1200 is based is a full color image of the skier. As shown in FIG. 12, image 1200 includes mostly black (null, suppressed) pixels, except for white (non-null, non-suppressed) pixels that form edges that have been enhanced by edge enhancer 808.

X-Y gradient image calculator 1102, N-O gradient image calculator 1104, non-maximum gradient suppressor 1106, and low gradient suppressor 1108 may be configured in hardware, software, firmware, or any combination thereof to perform their respective functions. For further description of Canny edge detection techniques, refer to Canny, J. "A computational approach to edge detection," IEEE Trans. Pattern Anal. Mach. Intell. 8, 6 (November 1986), pages 679-698.

Referring back to flowchart 900 (FIG. 9), in step 910, a plurality of candidate edge objects is detected in the edge enhanced image data set. For example, in an embodiment, candidate edge object detector 810 shown in FIG. 8 may be configured to detect candidate edge objects in edge enhanced image data set 820. As shown in FIG. 8, candidate edge object detector 810 receives edge enhanced image data set 820. Candidate edge object detector 810 may be configured to detect candidate edge objects according to any suitable edge detection algorithm or technique, as would be known to persons skilled in the relevant art(s). As shown in FIG. 8, candidate edge object detector 810 generates a plurality of candidate edge objects 822.

For example, in an embodiment, candidate edge object detector 810 may be configured to detect candidate edge objects in edge enhanced image data set 820, which are continuous chains of pixels (non-null, non-suppressed) pixels that are separated from other candidate edge objects by null pixels. In one embodiment described below with respect to FIGS. 13-15, candidate edge object detector 810 may be configured to process edge enhanced image data set 820 as a single unit. In another embodiment described below with respect to FIGS. 16-18, candidate edge object detector 810 may be configured to process edge enhanced image data set 820 in segments. These two techniques are described as follows.

Figure 13:
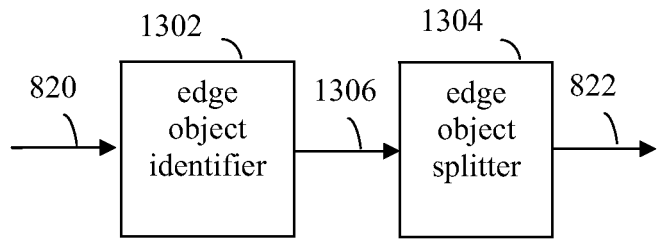
FIG. 13 shows a block diagram of a candidate edge object detector, according to an example embodiment.
Figure 14:
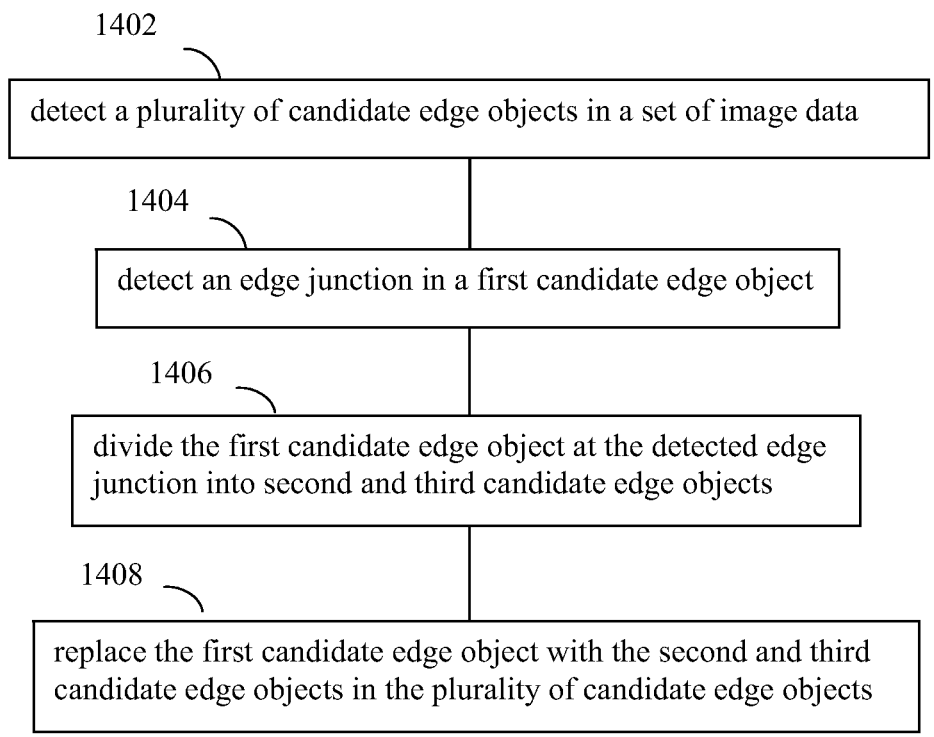
FIG. 14 shows a flowchart for detecting candidate edge objects, according to an example embodiment.

FIG. 13 shows a block diagram of candidate edge object detector 810, according to an example embodiment. As shown in FIG. 13, candidate edge object detector 810 includes an edge object identifier 1302 and an edge object splitter 1304. Edge object identifier 1302 and edge object splitter 1304 may be implemented in hardware, software, firmware, or any combination thereof. Candidate edge object detector 810 shown in FIG. 13 is described with respect to FIG. 14. FIG. 14 shows a flowchart 1400 for detecting candidate edge objects, according to an example embodiment. Flowchart 1400 is described as follows.

In step 1402, a plurality of candidate edge objects is detected in a set of image data. For example, edge object identifier 1302 may be configured to detect candidate edge objects in edge enhanced image data set 820. As shown in FIG. 13, edge object identifier 1302 receives edge enhanced image data set 820. In an embodiment, edge object identifier 1302 may be configured to identify a candidate edge object in edge enhanced image data set 820 by identifying a continuous chain of adjacent edge pixels (e.g., adjacent pixels that are non-null pixels) in edge enhanced image data set 820. Each continuous chain of adjacent edge pixels may be identified as a candidate edge object. Edge object identifier 1302 may identify any number of candidate edge objects in edge enhanced image data set 820, including ones, tens, hundreds, and even greater numbers of candidate edge objects. As shown in FIG. 13, edge object identifier 1302 generates a first plurality of candidate edge objects 1306. First plurality of candidate edge objects 1306 identifies the detected candidate edge objects, such as by coordinates of the pixels included in each detected candidate edge object.

Figure 15:
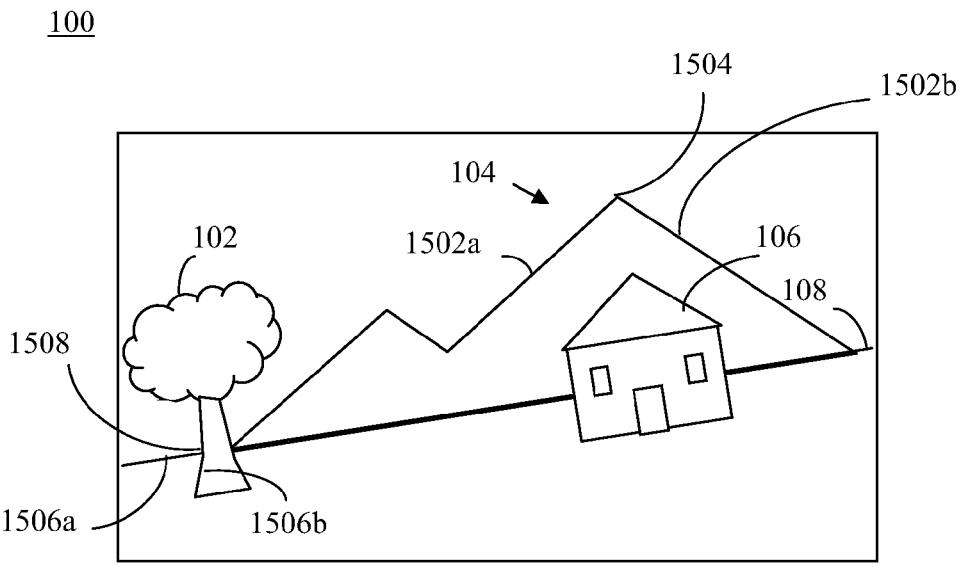
FIG. 15 shows an image undergoing candidate edge detection, according to an example embodiment.

In step 1404, an edge junction is detected in a first candidate edge object. For instance, edge object splitter 1304 may be configured to detect edge junctions in candidate edge objects. Edge junctions may be corners or intersections of edge lines in candidate edge objects, for example. Examples of edge junctions are shown in FIG. 15. FIG. 15 shows an image 1500, which for purposes of illustration is considered to be an edge enhanced version of image 100 shown in FIG. 1. The outlines and features of tree 102, mountains 104, house 106, and horizon 108 shown in FIG. 15 are considered to be enhanced edges. The enhanced edges forming separate entities in FIG. 15 may be candidate edge objects detected by edge object identifier 1302. For any candidate edge object in FIG. 15, edge object splitter 1304 may detect one or more edge junctions.

For example, a first candidate edge object of image 1500 may include edge segments 1502a and 1502b. As shown in FIG. 15, a corner 1504 is present in the first candidate edge object. Corner 1504 may be detected by edge object splitter 1304 as a first edge junction. A second candidate edge object of image 1500 may include edge segments 1506a and 1506b. As shown in FIG. 15, edge segment 1506a intersects with a midpoint of edge segment 1506b to form an intersection 1508. Intersection 1508 may be detected by edge object splitter 1304 as a second edge junction.

In step 1406, the first candidate edge object is divided at the detected edge junction into second and third candidate edge objects. For example, edge object splitter 1304 may be configured to divide the candidate edge objects having edge junctions detected in step 1404 into separate candidate edge objects. For example, referring to FIG. 15, edge object splitter 1304 may divide the first candidate edge object that includes edge segments 1502a and 1502b. Edge object splitter 1304 may divide the first candidate edge object at corner 1504 into first and second candidate edge objects corresponding to edge segments 1502a and 1502b. Edge object splitter 1304 may divide the second candidate edge object of image 1500 that include edge segments 1506a and 1506b. Edge object splitter 1304 may divide the second candidate edge object at intersection 1508 into an additional pair of first and second candidate edge objects corresponding to edge segments 1506a and 1506b.

In step 1408, the first candidate edge object is replaced with the second and third candidate edge objects in the plurality of candidate edge objects. For example, as shown in FIG. 13, edge object splitter 1304 generates plurality of candidate edge objects 822. Plurality of candidate edge objects 822 includes the first plurality of candidate edge objects 1306 identified by edge object identifier 1302, with any of the candidate edge objects that were divided by edge object splitter 1304 replaced with the candidate edge objects resulting from the division.

Figure 16:
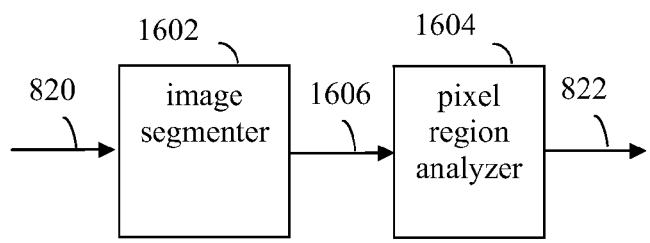
FIG. 16 shows a block diagram of a candidate edge object detector, according to another example embodiment.
Figure 17:
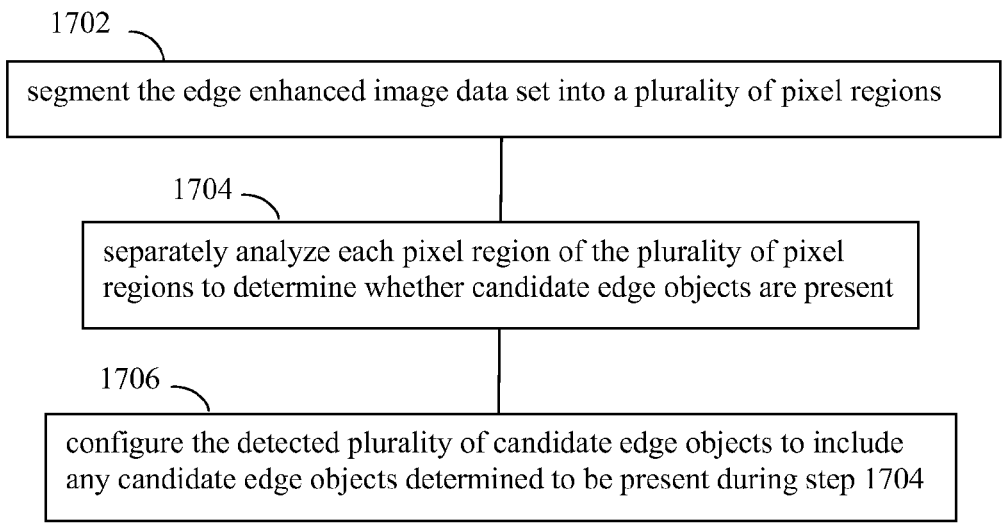
FIG. 17 shows a flowchart for detecting candidate edge objects, according to an example embodiment.

FIG. 16 shows a block diagram of candidate edge object detector 810, according to another example embodiment. As shown in FIG. 16, candidate edge object detector 810 includes an image segmenter 1602 and pixel region analyzer 1604. Image segmenter 1602 and pixel region analyzer 1604 may be implemented in hardware, software, firmware, or any combination thereof. Candidate edge object detector 810 shown in FIG. 16 is described with respect to FIG. 17. FIG. 17 shows a flowchart 1700 for detecting candidate edge objects, according to an example embodiment. Flowchart 1700 is described as follows.

Figure 18:
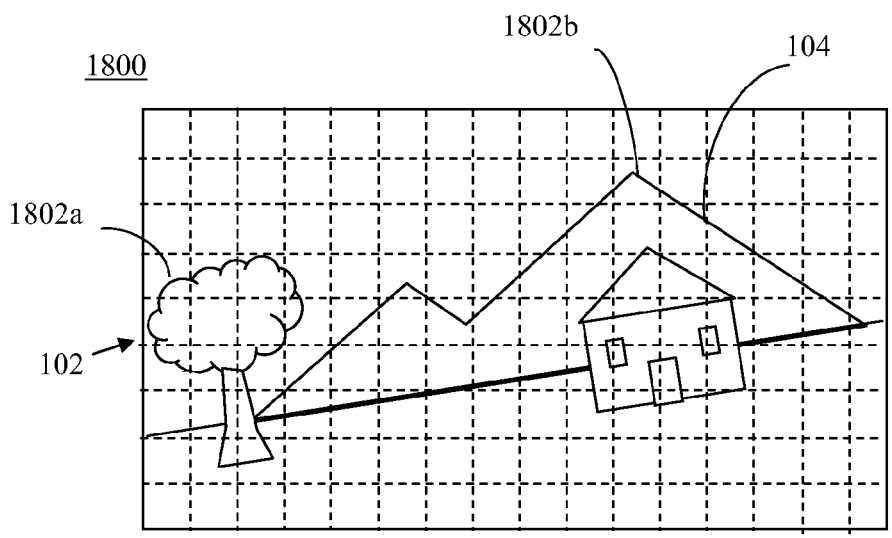
FIG. 18 shows an image segmented into pixel regions, according to an example embodiment.

In step 1702, the edge enhanced image data set is segmented into a plurality of pixel regions. For example, image segmenter 1602 may be configured to segment edge enhanced image data set 820 into a plurality of pixel regions. As shown in FIG. 16, image segmenter 1602 receives edge enhanced image data set 820. In an embodiment, image segmenter 1602 may be configured to segment edge enhanced image data set 820 into a plurality of pixel regions having a predetermined width and height (in pixels). For instance, the pixel regions may be 48 pixels by 48 pixels in size, or other size selected to minimize a number of edges that are superimposed (e.g., that include edge junctions). Examples of pixel regions are shown in FIG. 18. FIG. 18 shows an image 1800, which for purposes of illustration is considered to be an edge enhanced version of image 100 shown in FIG. 1. As shown in FIG. 18, image 1800 is divided into a plurality of regions 1802, including regions 1802a and 1802b. In the example of FIG. 18, regions 1802 have the same sizes. As shown in FIG. 16, image segmenter 1602 generates a plurality of pixel regions 1606, which indicates the segmentation of edge enhanced image data set 820.

In step 1704, each pixel region of the plurality of pixel regions is separately analyzed to determine whether candidate edge objects are present. For example, pixel region analyzer 1604 may be configured to analyze pixel regions for candidate edge objects. As shown in FIG. 16, pixel region analyzer 1604 receives plurality of pixel regions 1606. In an embodiment, pixel region analyzer 1604 may be configured to detect candidate edge objects in each pixel region (e.g., each pixel region 1802 shown in FIG. 18) of plurality of pixel regions 1606. Pixel region analyzer 1604 may be configured to identify a candidate edge object in a pixel region as a continuous chain of adjacent edge pixels (e.g., adjacent pixels that are non-null pixels) in the pixel region. For example, with respect to image 1800 in FIG. 18, for pixel region 1802a, pixel region analyzer 1604 may identify the portion of the edge of tree 102 in pixel region 1802a to be a candidate edge object. For pixel region 1802b, pixel region analyzer 1604 may identify the portion of the top edge of mountains 104 in pixel region 1802b to be a candidate edge object. Pixel region analyzer 1604 may identify any number of candidate edge objects in each pixel region. Note that in an embodiment, flowchart 1400 (FIG. 14) may be optionally performed for each of pixel regions 1802, to subdivide candidate edge objects at edge junctions.

In step 1706, the detected plurality of candidate edge objects is configured to include any candidate edge objects determined to be present during step 1704. For example, as shown in FIG. 16, pixel region analyzer 1604 generates plurality of candidate edge objects 822. Plurality of candidate edge objects 822 includes the candidate edge objects identified by pixel region analyzer 1604 for all of the plurality of pixel regions that were analyzed.

Referring back to flowchart 900 (FIG. 9), in step 912, the plurality of candidate edge objects is filtered to a plurality of detected edge objects. For example, in an embodiment, edge filter 812 shown in FIG. 8 may be configured to filter candidate edge objects to a set of detected edge objects. This filtering may be performed to determine the dominant straight line orientations in the original image, and to filter out candidate edge objects that are not substantially straight lines (e.g. are curved). As shown in FIG. 8, edge filter 812 receives plurality of candidate edge objects 822, and generates detected plurality of edges 710. Edge filter 812 may be configured to filter candidate edge objects according to any suitable filter algorithm or technique, as would be known to persons skilled in the relevant art(s). As shown in FIG. 8, candidate edge object detector 810 generates a plurality of candidate edge objects 822.

Figure 19:
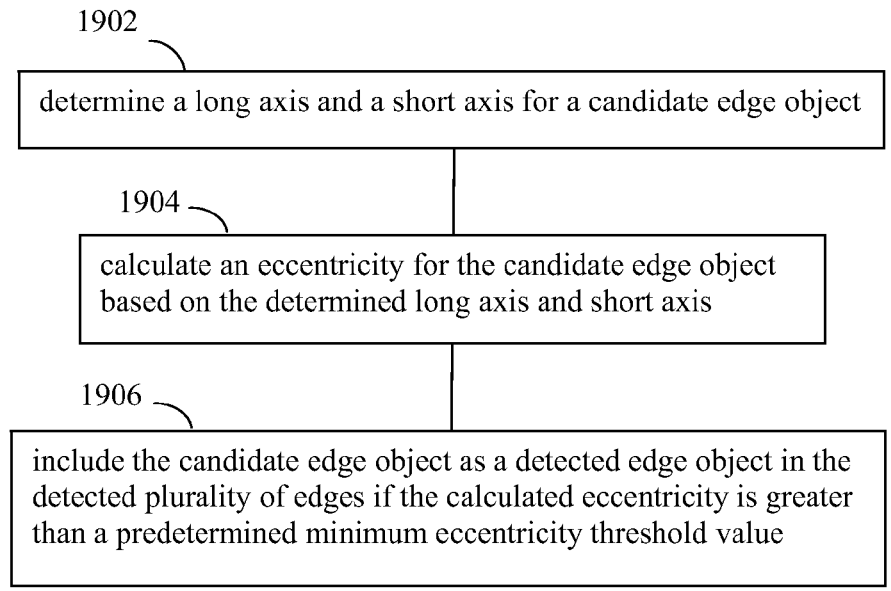
FIG. 19 shows a flowchart for filtering candidate edge objects, according to an example embodiment.

For instance, FIG. 19 shows a flowchart 1900 for filtering candidate edge objects, according to an example embodiment. Flowchart 1900 may be performed by edge filter 812, for example. In an embodiment, flowchart 1900 is performed by edge filter 812 for each candidate edge object received in plurality of candidate edge objects 822. Other structural and operational embodiments will be apparent to persons skilled in the relevant art(s) based on the discussion regarding flowchart 1900. Flowchart 1900 is described as follows.

Figure 20:
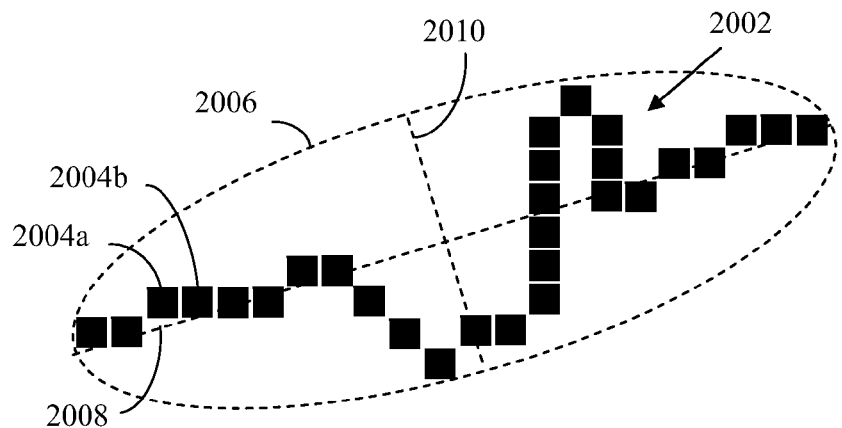
FIG. 20 shows an example candidate edge object, according to an embodiment.

In step 1902, a long axis and a short axis are determined for a candidate edge object. For example, edge filter 812 may receive a first candidate edge object received in plurality of candidate edge objects 822. Edge filter 812 may be configured to determine a long axis and a short axis for the candidate edge object. For instance, FIG. 20 shows an example candidate edge object 2002 that may be detected in an image and that may be analyzed by edge filter 812. As shown in FIG. 20, candidate edge object 2002 is formed from a plurality of pixels 2004, including pixels 2004a and 2004b. As shown in FIG. 20, candidate edge object 2002 has a long axis 2008, which is a straight axis extending through the longest dimension of candidate edge object 2002, and has a length equal to that longest dimension. Candidate edge object 2002 also has a short axis 2010. Short axis 2010 is a straight axis that is perpendicular to long axis 2008, and has a length equal to the greatest width of candidate edge object 2002 in the direction of short axis 2010. As shown in FIG. 20, long axis 2008 and short axis 2010 define an ellipse 2006 associated with candidate edge object 2002. Edge filter 812 may be capable of determining long axis 2008 and short axis 2010 for candidate edge object 2002.

For example, in an embodiment, edge filter 812 may calculate each of the following sums for a candidate edge object:

Sum1: the pixel count for a candidate edge object,

SumX: the sum of X coordinates for every pixel of the candidate edge object,

SumY: the sum of Y coordinates for every pixel of the candidate edge object,

SumXX: the sum of the square of X coordinates of the candidate edge object,

SumYY: the sum of the square of Y coordinates of the candidate edge object,

SumXY: the sum of the product of X and Y coordinates of the candidate edge object, SumGradX: the sum of gradients in the X direction of the candidate edge object, SumGradY: the sum of gradients in the Y direction of the candidate edge object, and SumGradNorm: the sum of gradient norm of the candidate edge object.

Each of these sums, and example techniques for their calculation, are described as follows.

Sum1 may be determined by edge filter 812 by summing the number of pixels of the candidate edge object. For instance, with reference to FIG. 20, edge filter 812 may sum the number of pixels 2004 of candidate edge object 2002, which is 29 pixels in the example of FIG. 20.

SumX may be determined by edge filter 812 by summing the values of the X coordinates of every pixel (a number Sum1 of pixels) of the candidate edge object. For instance, with reference to FIG. 20, edge filter 812 may sum together the X coordinate values of the coordinates (x, y) of each of the 29 pixels 2004 of candidate edge object 2002.

SumY may be determined by edge filter 812 by summing the values of the Y coordinates of every pixel (a number Sum1 of pixels) of the candidate edge object. For instance, with reference to FIG. 20, edge filter 812 may sum together the Y coordinate values of the coordinates (x, y) of each of the 29 pixels 2004 of candidate edge object 2002.

SumXX may be determined by edge filter 812 by summing the squares of the X coordinates of every pixel (a number Sum1 of pixels) of the candidate edge object. For instance, with reference to FIG. 20, edge filter 812 may sum together the squares of the X coordinate values of the coordinates (x, y) of each of the 29 pixels 2004 of candidate edge object 2002. SumXX may be expressed as follows in Equation 6:

$$SumXX = \sum_{i=1}^{Sum1} x_i^2 \quad \text{Equation 6}$$

where "$x_i$" is the X coordinate value of the ith pixel of the candidate edge object.

SumYY may be determined by edge filter 812 by summing the squares of the Y coordinates of every pixel (a number Sum1 of pixels) of the candidate edge object. For instance, with reference to FIG. 20, edge filter 812 may sum together the squares of the Y coordinate values of the coordinates (x, y) of each of the 29 pixels 2004 of candidate edge object 2002. SumYY may be expressed as follows in Equation 7:

$$SumYY = \sum_{i=1}^{Sum1} y_i^2 \quad \text{Equation 7}$$

where "$y_i$" is the Y coordinate value of the ith pixel of the candidate edge object.

SumXY may be determined by edge filter 812 by summing the product of the X and Y coordinates of every pixel (a number Sum1 of pixels) of the candidate edge object. For instance, with reference to FIG. 20, edge filter 812 may sum together the products of the X and Y coordinate values of the coordinates (x, y) of each of the 29 pixels 2004 of candidate edge object 2002. SumXY may be expressed as follows in Equation 8:

$$SumXY = \sum_{i=1}^{Sum1} x_i y_i \quad \text{Equation 8}$$

SumGradX may be determined by edge filter 812 by summing of the gradients in the X direction (GradientX) of the candidate edge object. As described above, GradientX for each pixel may be calculated according to Equation 2. For instance, with reference to FIG. 20, edge filter 812 may sum together the GradientX values determined for each of each of the 29 pixels 2004 of candidate edge object 2002. SumGradY may be expressed as follows in Equation 9:

$$SumGradX = \sum_{i=1}^{Sum1} GradientX_i \quad \text{Equation 9}$$

where "$GradientX_i$" is the GradientX value of the ith pixel of the candidate edge object.

SumGradY may be determined by edge filter 812 by summing of the gradients in the Y direction (GradientY) of the candidate edge object. As described above, GradientY for each pixel may be calculated according to Equation 3. For instance, with reference to FIG. 20, edge filter 812 may sum together the GradientY values determined for each of each of the 29 pixels 2004 of candidate edge object 2002. SumGradY may be expressed as follows in Equation 10:

$$SumGradY = \sum_{i=1}^{Sum1} GradientY_i \quad \text{Equation 10}$$

where "$GradientY_i$" is the GradientY value of the ith pixel of the candidate edge object.

SumGradNorm may be determined by edge filter 812 by summing of the gradient norms of the candidate edge object. As described above, a gradient norm for each pixel may be calculated according to Equation 4. For instance, with reference to FIG. 20, edge filter 812 may sum together the gradient norm values determined for each of each of the 29 pixels 2004 of candidate edge object 2002. SumGradNorm may be expressed as follows in Equation 11:

$$SumGradNorm = \sum_{i=1}^{Sum1} gradientnorm_i \quad \text{Equation 11}$$

where "$gradientnorm_i$" is the gradient norm value of the ith pixel of the candidate edge object.

These calculated sums provide basic statistics of the pixel distribution of a candidate edge object, and enable an eccentricity (elongation) and an average angle to be calculated for the candidate edge object. For example, principal component analysis (PCA) techniques may be used to calculate the long axis and the short axis for a candidate edge object modeled as an ellipsoidal distribution. For example, referring to FIG. 20, PCA techniques may be used to model candidate edge object 2002 as an ellipsoid (e.g., ellipse 2006), to calculate long axis 2008 and short axis 2010 as vectors. According to PCA techniques, the long axis and short axes are respectively derived from the square root of the two eigenvalues of the two-dimensional distribution covariance matrix for the candidate edge object. The corresponding directions of the long axis and short axis are derived from the eigenvectors. This is a direct application of PCA. PCA techniques, including the application of techniques of PCA to calculate a long axis and a short axis for a candidate edge object, will be known to persons skilled in the relevant art(s), and for purposes of brevity are not described in detail herein.

In step 1904, an eccentricity is calculated for the candidate edge object based on the determined long axis and short axis. For example, edge filter 812 may be configured to calculate an eccentricity for each candidate edge object received in plurality of candidate edge objects 822 for a particular image. Edge filter 812 may be configured to calculate an eccentricity for a candidate edge object based on the determined long axis and short axis for the candidate edge object. The eccentricity (or "elongation") may be calculated for a candidate edge object by edge filter 812 as the ratio between the length of the long axis and the length of the short axis, as shown below as Equation 12:

Eccentricity=length of long axis/length of short axis  Equation 12

In step 1906, the candidate edge object is included as a detected edge object in the detected plurality of edges if the calculated eccentricity is greater than a predetermined minimum eccentricity threshold value. For example, edge filter 812 may be configured to determine whether each candidate edge object received in plurality of candidate edge objects 822 for a particular image is sufficiently straight to be considered an edge. Edge filter 812 may be determine whether each candidate edge object is a detected edge based on the eccentricity calculated for the candidate edge object. If the calculated eccentricity is greater than a predetermined minimum eccentricity threshold value, the candidate edge object may be considered a detected edge object. Calculated eccentricity increases as candidate edge object is more "edge-like." The predetermined minimum eccentricity threshold value may be selected as an amount that reflects a sufficiently edge-like object, as desired for a particular application. For example, the predetermined minimum eccentricity threshold value may be selected to be 0.75, in an embodiment. In such an embodiment, if the calculated eccentricity is less or equal to 0.75, the candidate edge object is not sufficiently edge like, and is not further processed. If the calculated edge object is greater than 0.75, the candidate edge object is accepted as a detected edge object. As shown in FIG. 8, edge filter 812 generates detected plurality of edges 710. Any candidate edge objects accepted by edge filter 812 as detected edge objects for a particular image are included in detected plurality of edges 710.

B. Example Angle Determination Embodiments

Figures 21, 22:
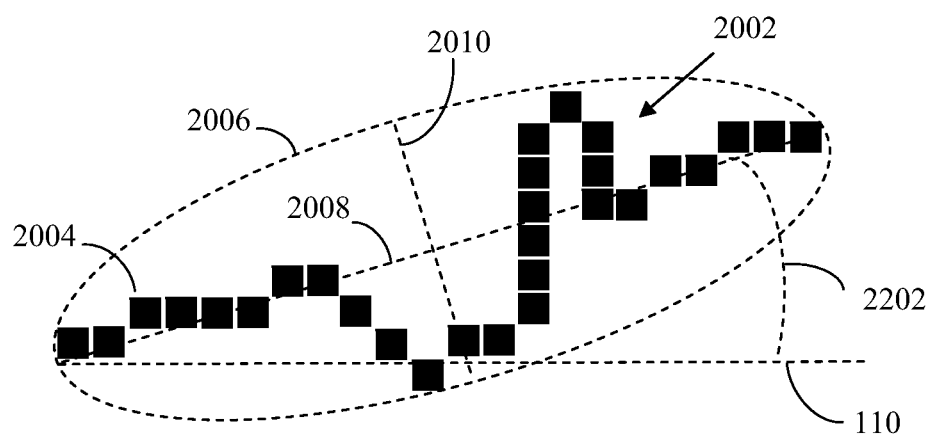
FIG. 21 shows a process for determining an angle for an edge in an image, according to an example embodiment.
FIG. 22 shows an angle determined for the candidate edge object of FIG. 20, according to an example embodiment.

Angle determiner 704 shown in FIG. 7 may be implemented in various ways. For instance, FIG. 21 shows a step 2102 for determining an angle for an edge in an image, according to an example embodiment. In step 2102, an angle is calculated between a first axis of the first image and the long axis determined for the candidate edge object corresponding to the detected edge object. For example, FIG. 22 shows candidate edge object 2002 of FIG. 20. For purposes of illustration, it assumed that candidate edge object 2002 was accepted by edge filter 812 to be a detected edge object. As indicated in FIG. 22, the angle of interest is an angle 2202. Angle 2202 is the angle between the x-axis (horizontal) 110 and long axis 2008 of candidate edge object 2002. Angle 2202 may be calculated in various ways.

For example, in an embodiment, angle 2202 may be calculated by angle determiner 704 according to Equation 13 shown below:

$$\text{angle } 2202 = \arctan(\text{VC of long axis } 2008/\text{HC of long axis } 2008) \quad \text{Equation 13}$$

where
  VC of long axis 2008=the vertical component of the vector of long axis 2008, and
  HC of long axis 2008=the horizontal component of the vector of long axis 2008.
The Equation 13 calculation may be referred to herein as the "PCA angle calculation."

In another embodiment, angle 2202 may be calculated by angle determiner 704 as follows. First, calculate an integrated gradient vector for (SumGradX, SumGradY), where SumGradX and SumGradY may be calculated according to Equations 9 and 10, as shown above. Second, calculate the angle of the integrated gradient vector for (SumGradX, SumGradY), such as according to Equation 14 shown below:

$$\text{angle } 2202 = \arctan(\text{VC of IV}/\text{HC of IV}) \quad \text{Equation 14}$$

where
  VC of IV=the vertical component of the integrated gradient vector (SumGradX, SumGradY), and
  HC of IV=the horizontal component of the integrated gradient vector (SumGradX, SumGradY).
This technique for angle calculation may be referred to herein as the "integrated gradient vector calculation."

Either or both of the PCA angle calculation and integrated gradient vector calculation techniques may be used to calculate an angle for a detected edge object. It is noted that if the detected edge object has a pixel distribution that is perfectly horizontal or perfectly vertical, a perfectly horizontal or vertical edge may not be indicated by edge detector 702 due to sampling biases, particularly if candidate edge object detector 810 performs image segmentation to detect candidate edge objects, as described above with respect to FIG. 16. In such a case where a detected edge object is very nearly or exactly horizontal or vertical, it may be desired to use the angle of the detected edge object calculated according to the integrated gradient vector calculation technique. Otherwise, the PCA angle calculation technique may be desired (e.g., for detected edge objects having angles that are not nearly or exactly horizontal or vertical).

As shown in FIG. 7, angle determiner 704 generates determined plurality of angles 712, which includes the determined angles for all of the detected edges of detected plurality of edges 710. In an embodiment, both of the PCA angle calculation and integrated gradient vector calculation techniques may be performed to calculate angles for detected edges. If the two resulting calculated angles are substantially different from each other (e.g., by a threshold angle amount), the corresponding detected edge object may be discarded from further analysis (e.g., no angle is included in determined plurality of angles 712 for the detected edge object).

C. Example Dominant Angle Selection Embodiments

Figure 23:
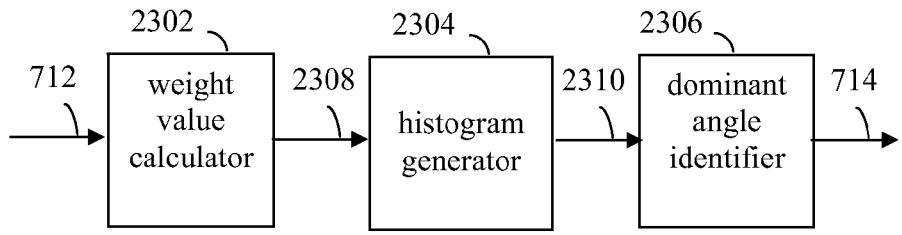
FIG. 23 shows a block diagram of a dominant angle selector, according to an example embodiment.
Figure 24:
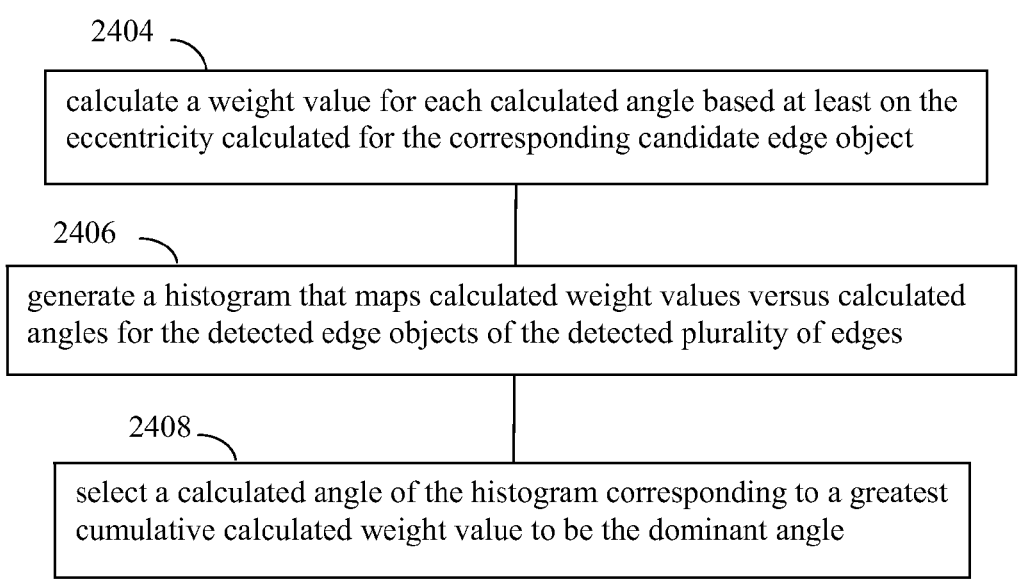
FIG. 24 shows a flowchart for determining a dominant angle in an image, according to an example embodiment.

Dominant angle selector 706 shown in FIG. 7 may be implemented in various ways. For instance, FIG. 23 shows a block diagram of dominant angle selector 706, according to an example embodiment. As shown in FIG. 23, dominant angle selector 706 includes a weight value calculator 2302, a histogram generator 2304, and a dominant angle identifier 2306. Weight value calculator 2302, histogram generator 2304, and dominant angle identifier 2306 may be implemented in hardware, software, firmware, or any combination thereof. Dominant angle selector 706 shown in FIG. 23 is described with respect to FIG. 24. FIG. 24 shows a flowchart 2400 for determining a dominant angle in an image, according to an example embodiment. All of the steps of flowchart 2400 shown in FIG. 24 do not necessarily need to be performed in all embodiments, and in some embodiments, may be performed in an order other than shown in FIG. 24. Other structural and operational embodiments will be apparent to persons skilled in the relevant art(s) based on the discussion regarding flowchart 2400. Flowchart 2400 is described as follows.

In step 2402, a weight value is calculated for each calculated angle based at least on the eccentricity calculated for the corresponding candidate edge object. Step 2402 is optional. For example, weight value calculator 2302 may be configured to calculate a weight value for each angle in determined plurality of angles 712 calculated for a detected edge object. As shown in FIG. 23, weight value calculator 2302 receives determined plurality of angles 712, and generates a plurality of angle weight values 2308. Weight value calculator 2302 may be configured to calculate a weight value for an angle according to any suitable technique or algorithm. For instance, weight value calculator 2302 may be configured to a weight value according to the eccentricity (e.g., calculated according to Equation 12 shown above), and/or according to other sum/statistic described above that may be calculated for the candidate edge object corresponding to the angle.

For example, in an embodiment, weight value calculator 2302 may be configured to calculate a weight value for an angle according to Equation 15 shown below:

weight value=eccentricity×sqrt(SumGradNorm)   Equation 15

Equation 15 is configured to favor highly elongated edges (greater eccentricity) and edges with steep gradients (sqrt (SumGradNorm)).

Angle weight values 2308 generated by weight value calculator 2302 includes a weight value calculated for each angle received from angle determiner 704 in determined plurality of angles 712.

In step 2404, a histogram is generated that maps calculated weight values versus calculated angles for the detected edge objects of the detected plurality of edges. For example, histogram generator 2304 may calculate a histogram that maps calculated weight values versus calculated angles. As shown in FIG. 23, histogram generator 2304 receives angle weight values 2308, and generates histogram data 2310. Histogram generator 2304 may be configured to map the calculated weight values (calculated by weight value calculator 2302) on a first axis, versus the calculated angles (calculated by angle determiner 704) on a second axis. The mapping may be performed mathematically, and may optionally be plotted for display.

Figure 25:
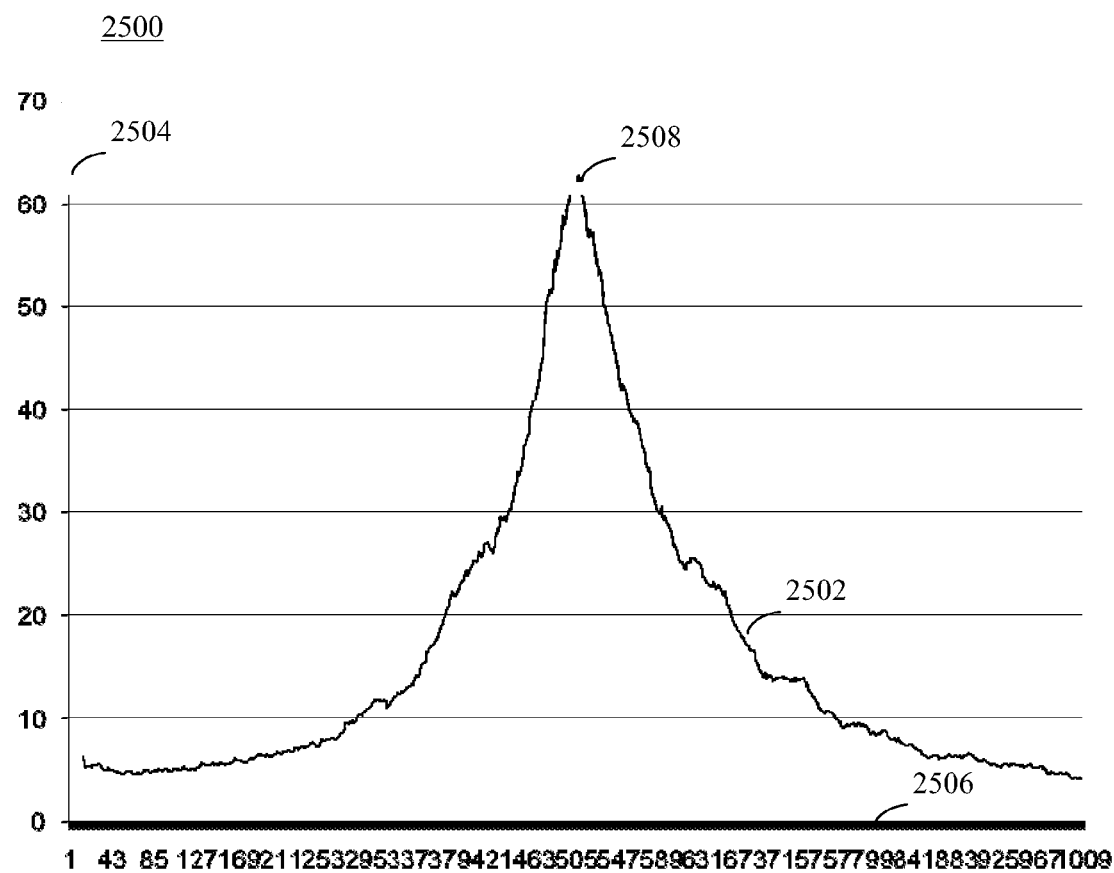
FIG. 25 shows a plot of a histogram mapping weight values versus angles, according to an example embodiment.

For instance, FIG. 25 shows a plot 2502 of a histogram 2500 that maps weight values on a Y-axis 2504 versus angles on an X-axis 2506, according to an example embodiment. In the example of FIG. 25, Y-axis 2504 has a range of 0 to 70, and X-axis 2506 has a range of 0 to 1023. The range of 0 to 1023 maps to an angle range of −45 degrees to +45 degrees. Histogram 2500 accumulates the weight values determined for each angle to generate a plot value for each angle.

Note that received angles that differ from 90 or 180 degree contribute to the same direction in histogram 2500. For instance, an angle calculated by angle determiner 704 in the range of −45 degrees to +45 degrees may indicate that the original image was tilted by an amount of the calculated angle. An angle calculated by angle determiner 704 in the range of +45 degrees to +135 degrees may indicate that the original image was tilted by the calculated angle minus 90 degrees. An angle calculated by angle determiner 704 in the range of +135 degrees to +225 degrees may indicate that the original image was tilted by the calculated angle minus 180 degrees. An angle calculated by angle determiner 704 in the range of +225 degrees to +315 degrees may indicate that the original image was tilted by the calculated angle minus 270 degrees.

Thus, for the purposes of histogram 2500, calculated angles outside of the range of −45 degrees to +45 degrees may be mapped into the range of −45 degrees to +45 degrees according to Table 2 shown below, for the purpose of histogram 2500:

TABLE 2

| calculated angle | mapped angle |
| --- | --- |
| between −45 degrees to +45 degrees | no mapping |
| between +45 degrees and +135 degrees | subtract 90 degrees |
| between +135 degrees and +225 degrees | subtract 180 degrees |
| between +225 degrees and +315 degrees | subtract 270 degrees |

Figure 26:
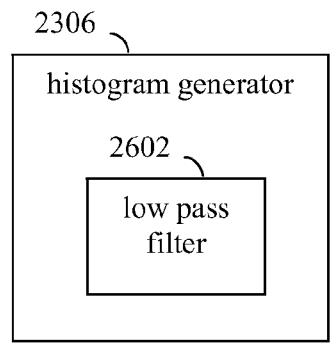
FIG. 26 shows a block diagram of a histogram generator, according to an example embodiment.

In an embodiment, to identify a maximum angle in histogram 2500 with better reliability, histogram 2500 may optionally be low pass filtered. For example, FIG. 26 shows a block diagram of histogram generator 2306, according to an example embodiment. As shown in FIG. 26, histogram generator 2306 includes a low pass filter 2602. Low pass filter 2602 is configured to perform low pass filtering of a histogram, such as histogram 2500 shown in FIG. 25. Low pass filter 2602 may be configured to perform any suitable low pass filtering technique or algorithm to a histogram, to smooth the distribution of accumulated weight values of plot 2502. For example, in an embodiment, low pas filter 2602 may apply a Gaussian-shaped kernel having a sigma parameter equal to 20, or other suitable sigma parameter value. Gaussian-shaped kernel filters are known to persons skilled in the relevant art(s), and thus are not described in further detail herein for purposes of brevity. Low pass filter 2602 may be configured in hardware, software, firmware, or any combination thereof.

In step 2406, a calculated angle of the histogram corresponding to a greatest cumulative calculated weight value is selected to be the dominant angle. For example, dominant angle identifier 2306 may be configured to identify a dominant angle in histogram data 2310. As shown in FIG. 23, dominant angle identifier 2306 receives histogram data 2310, and generates determined dominant angle 714. Dominant angle identifier 2306 may be configured to determine a dominant angle according to any suitable technique or algorithm. For instance, dominant angle identifier 2306 may identify the dominant angle to be the angle having the greatest cumulative calculated weight value in the histogram represented by histogram data 2310. For example, referring to histogram 2500 shown in FIG. 25, dominant angle identifier 2306 may identify the angle of X-axis 2506 corresponding to peak cumulative calculated weight value 2508, which is the highest peak of plot 2508.

Note that in the example of FIG. 25, a single significant cumulative calculated weight value is present (at value 2508 of plot 2508). In further instances, dominant angle identifier 2306 may identify more than one cumulative calculated weight value in a histogram represented by histogram data 2310. For instance, a second significant maximum may be defined as a second most significant angle in the histogram (after the greatest maximum) that is also a local maximum in the histogram within a range of +1 or −1 degree, or other range, and that is greater than a predetermined percentage (e.g., 85%) of the greatest maximum in the histogram. If there is a second or further significant maxima identified in the histogram, there is a substantial risk of ambiguity in determining a tilt angle for the image under analysis.

In an embodiment, when more than one significant maxima is present, dominant angle identifier 2306 may not provide a dominant angle in determined dominant angle 714, and the conclusion is that the image does not need straightening. In another embodiment, when more than one significant maxima is present, dominant angle identifier 2306 may provide all of the identified significant maxima to the user (e.g., displayed in a user interface). The user may be enabled to select one of the identified significant maxima to be the dominant angle.

The dominant angle provided in determined dominant angle 714 may be used by image rotator 708 in FIG. 7 to correct (rotate) first image data 304, as described above. In an embodiment, the user may be enabled to adjust/tweak the correction angle manually if desired (e.g., if not satisfied from the adjustment provided by image rotator 708).

V. Conclusion

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for implementing image tilt reducer 302, any elements thereof, flowchart 600 and/or any other flowchart herein, and/or further embodiments of the present invention described herein. Embodiments are directed to computer program products comprising such logic (e.g., in the form of software) stored on any computer useable medium. Such software, when executed in one or more data processing devices, causes a device to operate as described herein.

In another embodiment, a method for reducing image tilt is provided, including detecting a plurality of edges in a first image, determining a plurality of angles corresponding to the detected plurality of edges, selecting a dominant angle from the determined plurality of angles, and rotating the first image according to the selected dominant angle to generate a second image.

In an embodiment, the method may further include cropping the second image to a best fit rectangular image shape.

In an embodiment, the detecting a plurality of edges in the first image may comprise: generating a grayscale image data set from a set of data representative of the digital image, filtering the grayscale image data set, performing edge enhancement on the filtered grayscale image data set to generate an edge enhanced image data set, and detecting a plurality of candidate edge objects in the edge enhanced image data set.

In an embodiment, the detecting a plurality of candidate edge objects in the edge enhanced image data set may comprise: detecting an edge junction in a first candidate edge object, dividing the first candidate edge object at the detected edge junction into second and third candidate edge objects, and replacing the first candidate edge object with the second and third candidate edge objects in the plurality of candidate edge objects.

In an embodiment, the detecting a plurality of candidate edge objects in the edge enhanced image data set may comprise: segmenting the edge enhanced image data set into a plurality of pixel regions, separately analyzing each pixel region of the plurality of pixel regions to determine whether candidate edge objects are present, and configuring the detected plurality of candidate edge objects to include any candidate edge objects determined to be present during said analyzing.

In an embodiment, the detecting a plurality of edges in the first image may further comprise: for each candidate edge object of the plurality of candidate edge objects, determining a long axis and a short axis, calculating an eccentricity based on the determined long axis and short axis, and including the candidate edge object as a detected edge object in the detected plurality of edges if the calculated eccentricity is greater than a predetermined minimum eccentricity threshold value.

In an embodiment, the determining a plurality of angles corresponding to the determined plurality of edges may comprise: for each detected edge object in the detected plurality of edges, calculating an angle between a first axis of the first image and the long axis determined for the candidate edge object corresponding to the detected edge object.

In an embodiment, the selecting a dominant angle from the determined plurality of angles may comprise: calculating a weight value for each calculated angle based at least on the eccentricity calculated for the corresponding candidate edge object, and generating a histogram that maps calculated weight values versus calculated angles for the detected edge objects of the detected plurality of edges.

In an embodiment, the selecting a dominant angle from the determined plurality of angles further may comprise: selecting an angle of the histogram corresponding to a greatest cumulative calculated weight value to be the dominant angle.

In another embodiment, an image tilt reduction system is provided that includes an edge detector configured to detect a plurality of edges in a first image, an angle determiner configured to determine a plurality of angles corresponding to the determined plurality of edges, a dominant angle selector configured to determine a dominant angle from the determined plurality of angles, and an image rotator configured to rotate the first image according to the selected dominant angle to generate a second image.

In an embodiment, the image rotator may be configured to crop the second image to a best fit rectangular image shape.

In an embodiment, the edge detector may comprise: an image color format converter configured to convert a set of data representative of the digital image to a grayscale image data set, an image filter configured to filter the grayscale image data set, an edge enhancer configured to perform edge enhancement on the filtered grayscale image data set to generate an edge enhanced image data set, and a candidate edge object detector configured to detect a plurality of candidate edge objects in the edge enhanced image data set.

In an embodiment, the candidate edge object detector may comprise: an edge object identifier configured to detect candidate edge objects in the edge enhanced image data set, and an edge object splitter configured to scan candidate edge objects in the edge enhanced image data set to detect edge junctions, and to divide each candidate edge object having a detected edge junction at the detected edge junction into second and third candidate edge objects.

In an embodiment, the candidate edge object detector may comprise: an image segmenter configured to segment the edge enhanced image data set into a plurality of pixel regions, and a pixel region analyzer configured to analyze each pixel region of the plurality of pixel regions to determine the presence of candidate edge objects, and to include any candidate edge objects determined to be present in the plurality of candidate edge objects.

In an embodiment, the edge detector may further comprise: an edge filter configured to determine a long axis and a short axis for a candidate edge object, and to calculate an eccentricity based on the determined long axis and short axis, wherein the edge filter is configured to include the candidate edge object in the detected plurality of edges as a detected edge object if the calculated eccentricity is greater than a predetermined minimum eccentricity threshold value.

In an embodiment, the dominant angle selector may be configured to calculate for the detected edge object an angle between a first axis of the first image and the determined long axis determined for the candidate edge object corresponding to the detected edge object.

In an embodiment, the dominant angle selector may further comprise: a weight value calculator configured to calculate a weight value for each calculated angle based at least on the eccentricity calculated for the corresponding candidate edge object, and a histogram generator configured to generate a histogram that maps calculated weight value versus calculated angle for each detected edge object of the detected plurality of edges.

In an embodiment, the dominant angle selector may further comprise: a dominant angle identifier configured to select an angle of the histogram corresponding to a greatest cumulative calculated weight value to be the dominant angle.

In another embodiment, a method for removing tilt from a digital image is provided, comprising: detecting a plurality of edges in the digital image, determining a plurality of angles corresponding to the detected plurality of edges, enabling a user to select an angle of the plurality of angles, and rotating the digital image according to the selected angle to generate a de-tilted image.

In an embodiment, the enabling may comprise: displaying the plurality of angles in a list in a user interface.

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for reducing image tilt, comprising:
   detecting a plurality of edges in a first image;
   determining a plurality of angles corresponding to the detected plurality of edges;
   selecting a dominant angle from the determined plurality of angles; and
   rotating the first image according to the selected dominant angle to generate a second image;
   said detecting a plurality of edges in the first image comprising
      for at least one candidate edge object of a plurality of candidate edge objects,
         determining a long axis and a short axis,
         calculating an eccentricity based on the determined long axis and short axis, and
         including the candidate edge object as a detected edge object in the detected plurality of edges if the calculated eccentricity is greater than a predetermined minimum eccentricity threshold value.

2. The method of claim 1, further comprising:
   cropping the second image to a best fit rectangular image shape.

3. The method of claim 1, wherein said detecting a plurality of edges in the first image further comprises:
   generating a grayscale image data set from a set of data representative of the digital image;
   filtering the grayscale image data set;
   performing edge enhancement on the filtered grayscale image data set to generate the edge enhanced image data set; and
   detecting a plurality of candidate edge objects in the edge enhanced image data set.

4. The method of claim 3, wherein said detecting a plurality of candidate edge objects in the edge enhanced image data set comprises:
   detecting an edge junction in a first candidate edge object;
   dividing the first candidate edge object at the detected edge junction into second and third candidate edge objects; and
   replacing the first candidate edge object with the second and third candidate edge objects in the plurality of candidate edge objects.

5. The method of claim 3, wherein said detecting a plurality of candidate edge objects in the edge enhanced image data set comprises:
   segmenting the edge enhanced image data set into a plurality of pixel regions;
   separately analyzing each pixel region of the plurality of pixel regions to determine whether candidate edge objects are present; and
   configuring the detected plurality of candidate edge objects to include any candidate edge objects determined to be present during said analyzing.

6. The method of claim 1, wherein said calculating an eccentricity based on the determined long axis and short axis comprises:
   dividing a length of the long axis by a length of the short axis to calculate the eccentricity for a candidate edge object.

7. The method of claim 1, wherein said determining a plurality of angles corresponding to the determined plurality of edges comprises:
   for each detected edge object in the detected plurality of edges, calculating an angle between a first axis of the first image and the long axis determined for the candidate edge object corresponding to the detected edge object.

8. The method of claim 7, wherein said selecting a dominant angle from the determined plurality of angles comprises:
   calculating a weight value for each calculated angle based at least on the eccentricity calculated for the corresponding candidate edge object; and
   generating a histogram that maps calculated weight values versus calculated angles for the detected edge objects of the detected plurality of edges.

9. The method of claim 8, wherein said selecting a dominant angle from the determined plurality of angles further comprises:
   selecting an angle of the histogram corresponding to a greatest cumulative calculated weight value to be the dominant angle.

10. An image tilt reduction system, comprising:
    an edge detector configured to detect a plurality of edges in a first image;
    an angle determiner configured to determine a plurality of angles corresponding to the determined plurality of edges;
    a dominant angle selector configured to determine a dominant angle from the determined plurality of angles; and
    an image rotator configured to rotate the first image according to the selected dominant angle to generate a second image and
    wherein the edge detector comprises:
       an edge filter configured to determine a long axis and a short axis for a candidate edge object detected by the edge detector, and to calculate an eccentricity based on the determined long axis and short axis; and
       wherein the edge filter is configured to include the candidate edge object in the detected plurality of edges as a detected edge object if the calculated eccentricity is greater than a predetermined minimum eccentricity threshold value.

11. The system of claim 10, wherein the image rotator is configured to crop the second image to a best fit rectangular image shape.

12. The system of claim 10, wherein the edge detector comprises:
an image color format converter configured to convert a set of data representative of the digital image to a grayscale image data set;
an image filter configured to filter the grayscale image data set;
an edge enhancer configured to perform edge enhancement on the filtered grayscale image data set to generate an edge enhanced image data set; and
a candidate edge object detector configured to detect a plurality of candidate edge objects in the edge enhanced image data set.

13. The system of claim 12, wherein the candidate edge object detector comprises:
an edge object identifier configured to detect candidate edge objects in the edge enhanced image data set; and
an edge object splitter configured to scan candidate edge objects in the edge enhanced image data set to detect edge junctions, and to divide each candidate edge object having a detected edge junction at the detected edge junction into second and third candidate edge objects.

14. The system of claim 12, wherein the candidate edge object detector comprises:
an image segmenter configured to segment the edge enhanced image data set into a plurality of pixel regions; and
a pixel region analyzer configured to analyze each pixel region of the plurality of pixel regions to determine the presence of candidate edge objects, and to include any candidate edge objects determined to be present in the plurality of candidate edge objects.

15. The system of claim 10, wherein the edge filter is configured to divide a length of the long axis by a length of the short axis to calculate the eccentricity for the candidate edge object.

16. The system of claim 10, wherein the dominant angle selector is configured to calculate for the detected edge object an angle between a first axis of the first image and the determined long axis determined for the candidate edge object corresponding to the detected edge object.

17. The system of claim 16, wherein the dominant angle selector further comprises:
a weight value calculator configured to calculate a weight value for each calculated angle based at least on the eccentricity calculated for the corresponding candidate edge object; and
a histogram generator configured to generate a histogram that maps calculated weight value versus calculated angle for each detected edge object of the detected plurality of edges.

18. The system of claim 17, wherein the dominant angle selector further comprises:
a dominant angle identifier configured to select an angle of the histogram corresponding to a greatest cumulative calculated weight value to be the dominant angle.

19. A method for removing tilt from a digital image, comprising:
detecting a plurality of edges in the digital image, including for at least one candidate edge object,
determining a long axis and a short axis,
calculating an eccentricity based on the determined long axis and short axis, and
including the candidate edge object as a detected edge in the detected plurality of edges if the calculated eccentricity is greater than a predetermined minimum eccentricity threshold value;
determining a plurality of angles corresponding to the detected plurality of edges;
enabling a user to select an angle of the plurality of angles; and
rotating the digital image according to the selected angle to generate a de-tilted image.

20. The method of claim 19, wherein said enabling comprises:
displaying the plurality of angles in a list in a user interface.

* * * * *